US012739491B2

(12) United States Patent
Sugg et al.

(10) Patent No.: US 12,739,491 B2
(45) Date of Patent: Sep. 15, 2026

(54) SCANNING CAMERA SYSTEM

(71) Applicant: Vega Wave Systems, Inc., West Chicago, IL (US)

(72) Inventors: Alan Sugg, Naperville, IL (US); Anthony Moretti, Saint Charles, IL (US)

(73) Assignee: Vega Wave Systems, Inc., West Chicago, IL (US)

(*) Notice: Subject to any disclaimer, the term of this patent is extended or adjusted under 35 U.S.C. 154(b) by 313 days.

(21) Appl. No.: 18/288,923

(22) PCT Filed: Apr. 25, 2022

(86) PCT No.: PCT/US2022/026114
§ 371 (c)(1),
(2) Date: Oct. 30, 2023

(87) PCT Pub. No.: WO2022/260768
PCT Pub. Date: Dec. 15, 2022

(65) Prior Publication Data

US 2024/0259663 A1 Aug. 1, 2024

Related U.S. Application Data

(60) Provisional application No. 63/181,139, filed on Apr. 28, 2021.

(51) Int. Cl.
*H04N 23/50* (2023.01)
*G02B 6/42* (2006.01)
*G02B 26/10* (2006.01)

(52) U.S. Cl.
CPC ......... *H04N 23/555* (2023.01); *G02B 6/4298* (2013.01); *G02B 26/105* (2013.01)

(58) Field of Classification Search
CPC ................ H04N 23/555; G02B 6/4298; G02B 26/105; G02B 26/0833; G02B 26/101; Y02E 30/00
See application file for complete search history.

(56) References Cited

U.S. PATENT DOCUMENTS

2004/0122289 A1 6/2004 Mizuno
2010/0117885 A1* 5/2010 Holbrook ................ G01S 13/89 342/22

(Continued)

FOREIGN PATENT DOCUMENTS

CN 111287988 A * 6/2020 ......... G01N 21/8851
GB 2472574 A * 2/2011 ......... G02B 6/03622

OTHER PUBLICATIONS

Gregory et al. "The Deformable Mirror Demonstration Mission (DeMi) CubeSat: optomechanical design validation and laboratory calibration", Space Telescopes and Instrumentation, Procs. of SPIE vol. 10698, 2018, p. 1069857-1-1069857-16. (Year: 2018).*

(Continued)

*Primary Examiner* — Uzma Alam
*Assistant Examiner* — Mamadou Faye
(74) *Attorney, Agent, or Firm* — Peter K. Trzyna, Esq.

(57) ABSTRACT

Articles of manufacture, machines, processes for using the articles and machines, processes for making the articles and machines, and products produced by the process of making, along with necessary intermediates, directed to a scanning camera system.

19 Claims, 22 Drawing Sheets

(56) References Cited

U.S. PATENT DOCUMENTS

| | | | | |
|---|---|---|---|---|
| 2021/0088452 | A1* | 3/2021 | Gupta | G01N 21/8806 |
| 2021/0208051 | A1* | 7/2021 | Ju | B33Y 50/02 |
| 2021/0282631 | A1* | 9/2021 | Schultheis | A61B 1/07 |

OTHER PUBLICATIONS

NBS “Space Radiation Affects Glass Refractive Properties”, S.P.I.E Journal vol. 8, 1970, p. 1-2. (Year: 1970).*
Translation of CN 111287988 A (Year: 2020).*
“Office Action-Non-Final” dated Mar. 4, 2026, in U.S. Appl. No. 18/684,399, filed Feb. 16, 2024. USPTO. pp. 1-33.
“Second Preliminary Amendment” filed Aug. 13, 2024, in U.S. Appl. No. 18/684,399, filed Feb. 16, 2024. USPTO. pp. 1-10.
“Preliminary Amendment” filed Feb. 16, 2024, in U.S. Appl. No. 18/684,399, filed Feb. 16, 2024. USPTO. pp. 1-15.
PCT Patent Application No. PCT/2022/040293, Titled “High-Resolution Scanning Camera System”, filed on Aug. 15, 2022. pp. 1-32.

* cited by examiner

Figure 3 A
Figure 3 B
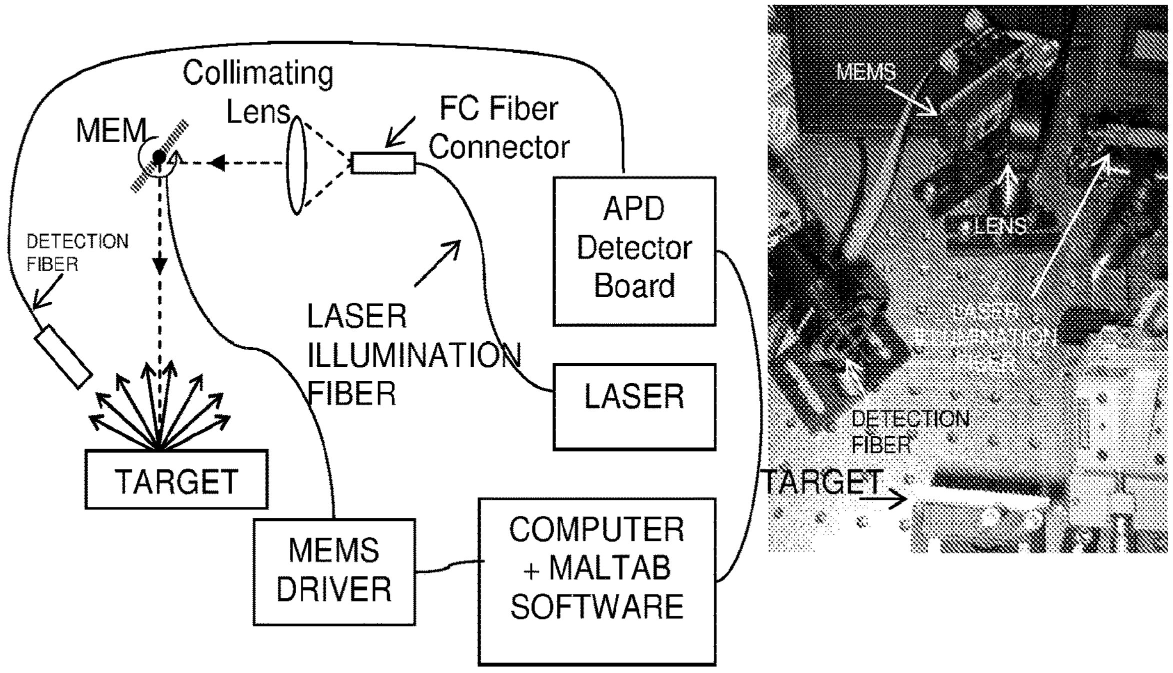
Figure 3
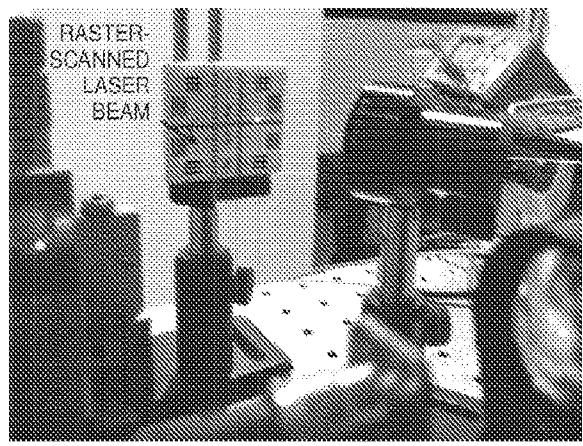

Figures 7A, 7B, 7C, and 7D
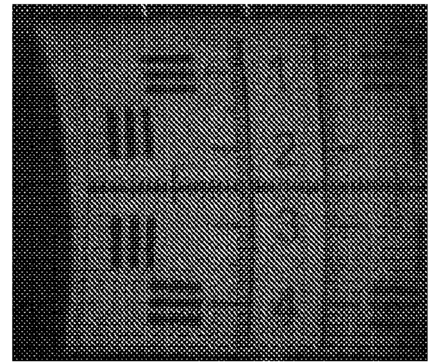
7B
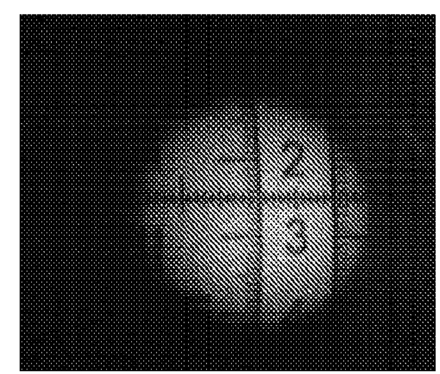
7C
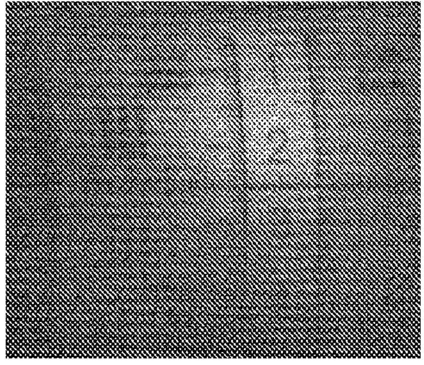
7D
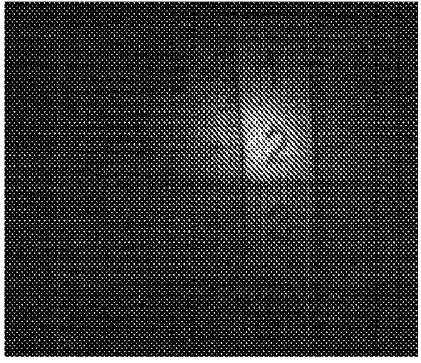

Hermetic Video Head Housing

Control

Power Supply

Hermetic Feed through

Illumination Fiber

MEMS Drive Cable

High Radiation Environment

Flexible Conduit

Large Diameter Collection Fiber

HSync

VSync

Frame Grabber

To PC

Figure 27A and 27B
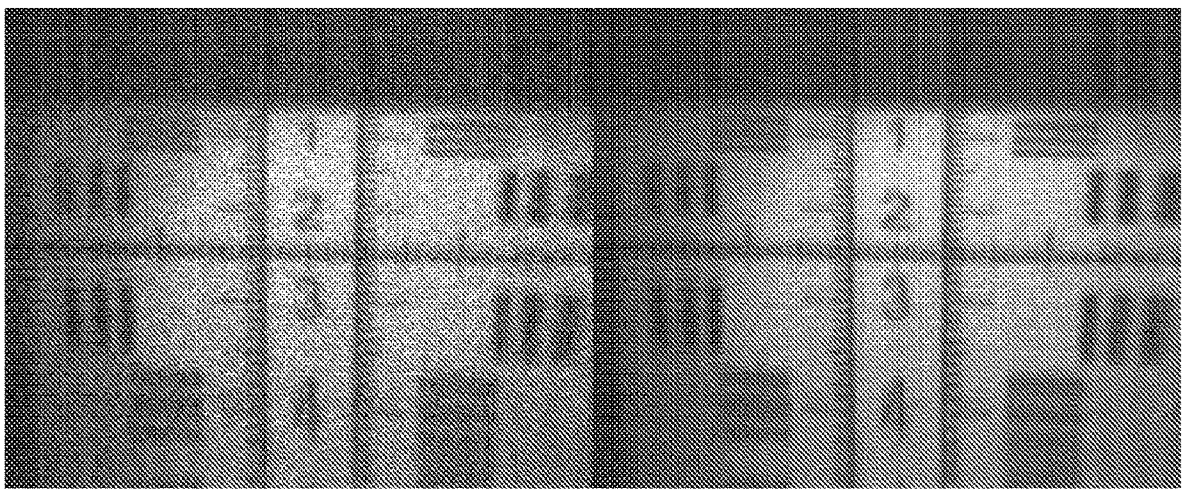
Figure 28A and 28B
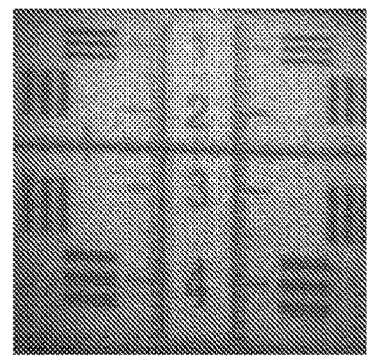
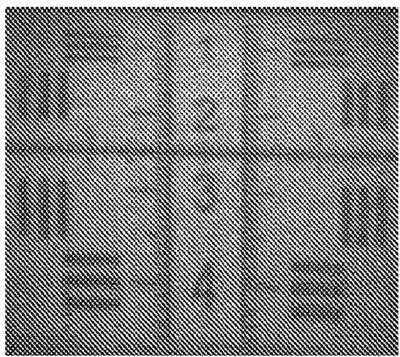
Figure 29A and 29B
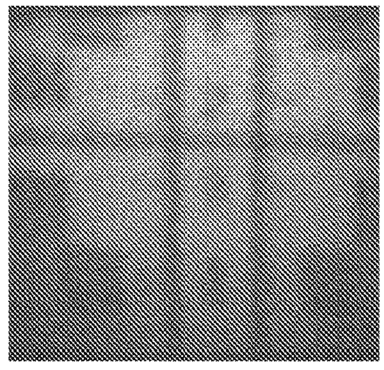
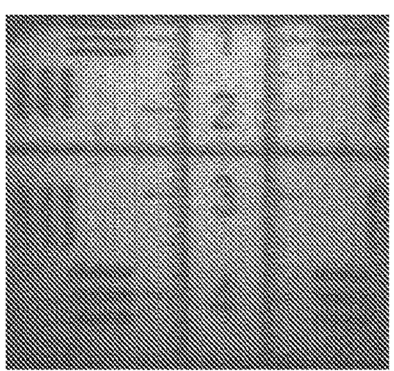

| Date | Dose rate Gy/min | Hours | Total Dose Gy |
|---|---|---|---|
| 12/12/2016 | 2.450 | 3 | 441.0 |
| 12/13/2016 | 2.449 | 24 | 3,526.6 |
| 12/14/2016 | 2.448 | 24 | 3,525.1 |
| 12/15/2016 | 2.488 | 24 | 3,582.7 |
| 12/16/2016 | 2.447 | 13.5 | 1,982.1 |
| **Totals** | | **88.5** | **13,057.5** |

SCANNING CAMERA SYSTEM

II. Priority

This application claims the benefit of U.S. Provisional Patent Application No. 63/181,139, filed Apr. 28, 2021, and entitled "Scanning Camera System", which is hereby incorporated by reference in its entirety as if fully restated herein.

I. STATEMENT REGARDING FEDERALLY SPONSORED RESEARCH OR DEVELOPMENT

This invention was made with government support under DE-SC0011905, DE-SC0015142, and DE-SC0015768 awarded by U.S. Department of Energy. The government has certain rights in the invention.

III. Background

Currently, visual inspection systems for nuclear energy applications, e.g., in a reactor vessel or in accident conditions, are quite limited. Commercially available radiation-hardened vision systems are rated to 1 MGy, limiting their use to radiation levels lower than in areas where it is needed for accurate, reliable inspections. To achieve this radiation hardness, even after replacing the radiation-sensitive image sensors with 1980's-vintage vidicon tubes, these systems rely on encasing the units with heavy lead shielding, resulting in weights of ~80 lbs., rendering them difficult to use. In the case of nuclear accidents, lighter, smaller, and more maneuverable systems are needed. The current systems based on vidicon tubes have resolution of 550-600 horizontal lines. In the case of the Fukushima accident an industrial video system was used that was rated to radiation doses up to 1000 Gy, but this video system lasted 14 hours at a radiation level of 70 Gy/hr. Clearly, better and more radiation-hardened vison systems are needed. Further, a high-definition system would be much more useful in the inspection process.

Accordingly, there is a need for improvement over such past approaches and for alternatives such as those that are more convenient to use.

IV. SUMMARY

The disclosure below uses different embodiments to teach the broader principles with respect to articles of manufacture, apparatuses, processes for using the articles and apparatuses, processes for making the articles and apparatuses, and products produced by the process of making, along with necessary intermediates, directed to direct nuclear power conversion. This Summary is provided to introduce the idea herein that a selection of concepts is presented in a simplified form as further described below. This Summary is not intended to identify key features or essential features of subject matter, nor this Summary intended to be used to limit the scope of claimed subject matter. Additional aspects, features, and/or advantages of examples will be indicated in part in the description which follows and, in part, will be apparent from the description, or may be learned by practice of the disclosure.

The following description and drawings are illustrative and are not to be construed as limiting. Numerous specific details are described to provide a thorough understanding of the disclosure. However, in certain instances, well-known or conventional details are not described in order to avoid obscuring the description.

References to one or an embodiment in the present disclosure can be, but not necessarily are, references to the same embodiment; and, such references mean at least one of the embodiments. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

With the foregoing in mind, consider an apparatus (method of using, method of making, and products produced thereby) including scanning camera system such as a system including a camera specially adapted to survive, and show minimal degradation in the presence of, high levels of radiation such as is encountered in nuclear power plant refueling, inspection and monitoring, nuclear fuel production, inspection and storage, nuclear spent fuel inspection, repair and storage, nuclear accident conditions, radiation hot cells, or similar applications where there is gamma, x-ray, neutron or other high-energy particle or high-energy photon radiation. Some implementations lower radiation-induced noise.

V. INDUSTRIAL APPLICABILITY

Industrial applicability is representatively directed to that of apparatuses and devices, articles of manufacture—particularly scanning camera systems—and processes of making and using them. Industrial applicability also includes industries engaged in the foregoing, as well as industries operating in cooperation therewith, depending on the implementation.

VI. Drawings

In the non-limiting examples of the present disclosure, please consider the following:

FIG. 3A is a diagram of a dual rad-hard fiber laser-illuminated/scattered light embodiment.

FIG. 3B is an image of a dual rad-hard fiber laser-illuminated/scattered light embodiment.

FIG. 3C is an image of a dual rad-hard fiber laser-illuminated/scattered light embodiment with a target.

FIGS. 7A-D are images of the target taken with the Dual Fiber Laser-Illuminated/Scattered Light Setup of FIG. 3.

Figure 8:
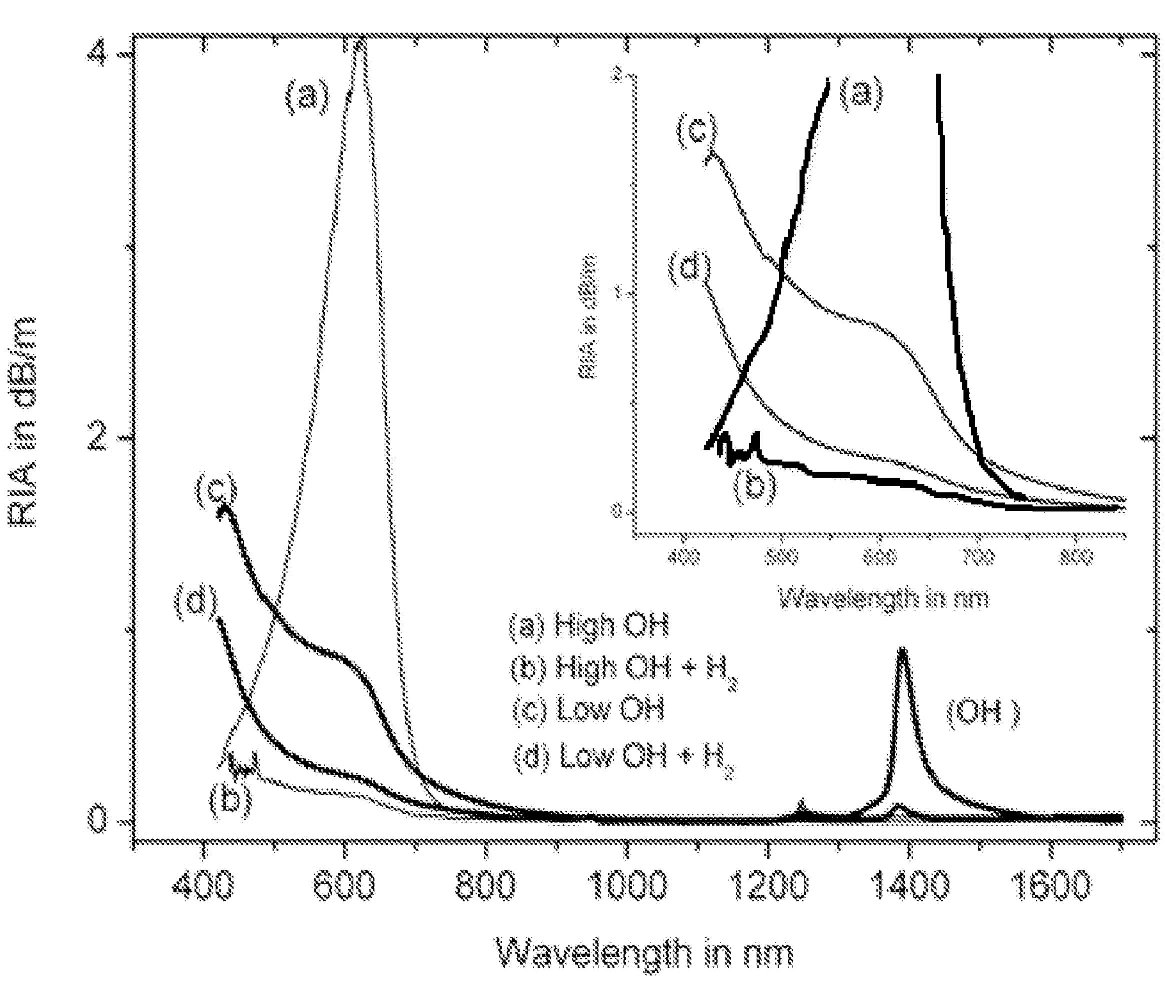

FIG. 8 illustrates the wavelength spectrum of radiation induced attenuation in the optical fibers.

Figure 9:
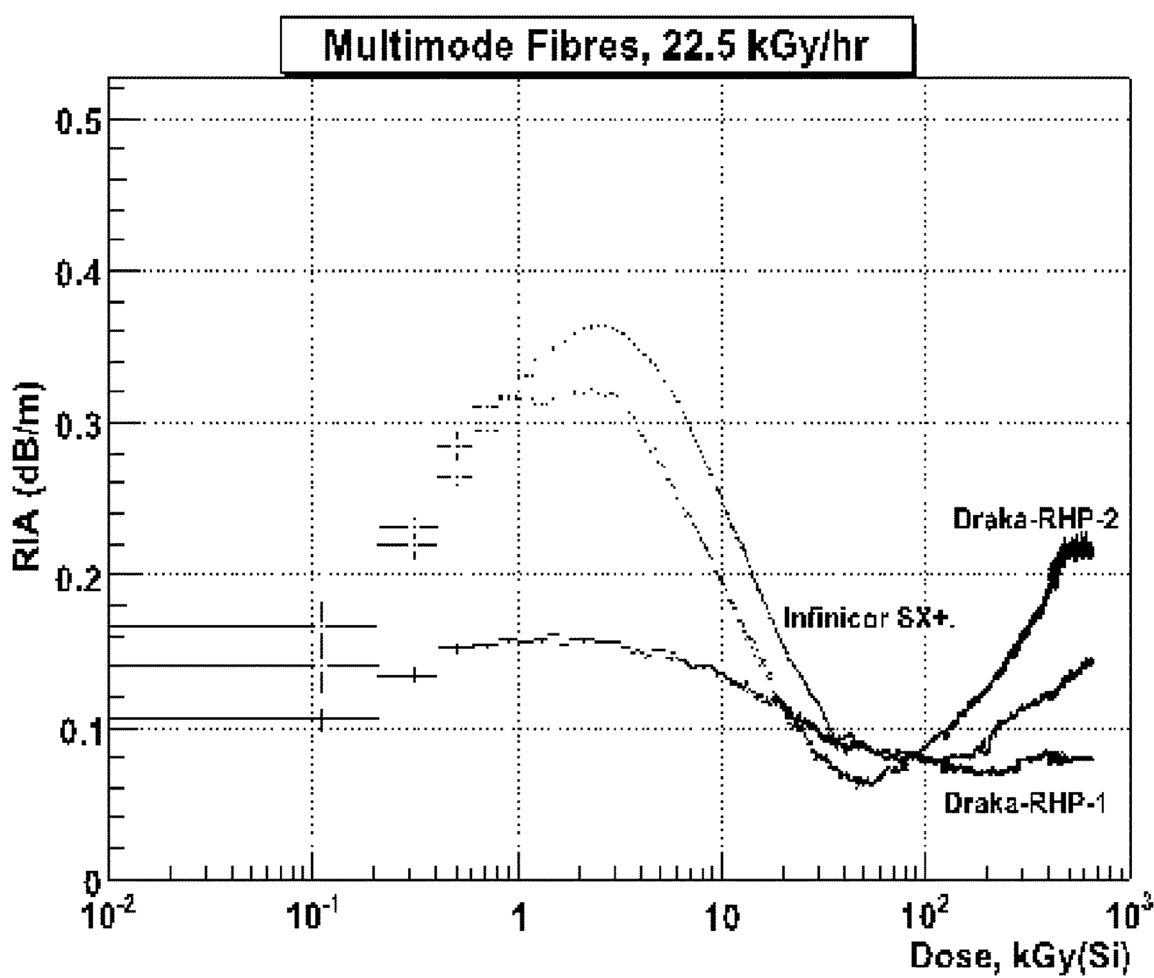

FIG. 9 illustrates a typical radiation-induced attenuation versus dose (gamma) in pure silica core fibers with various OH and $H_2$ concentrations.

Figure 10:
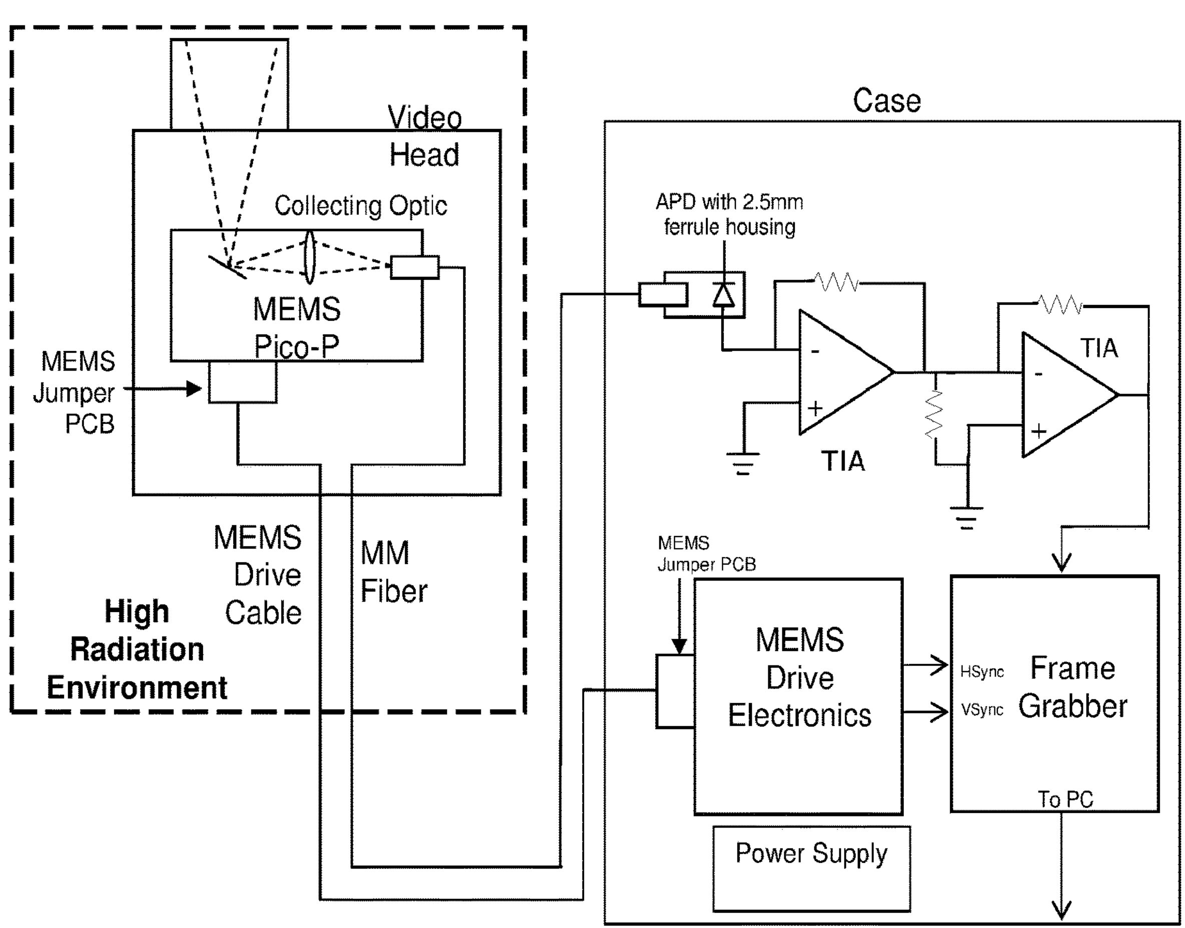

FIG. 10 is a block diagram of For A Radiation-Hard Real-Time Video System using an avalanche photodiode (APD) as the active detectors.

Figure 11:
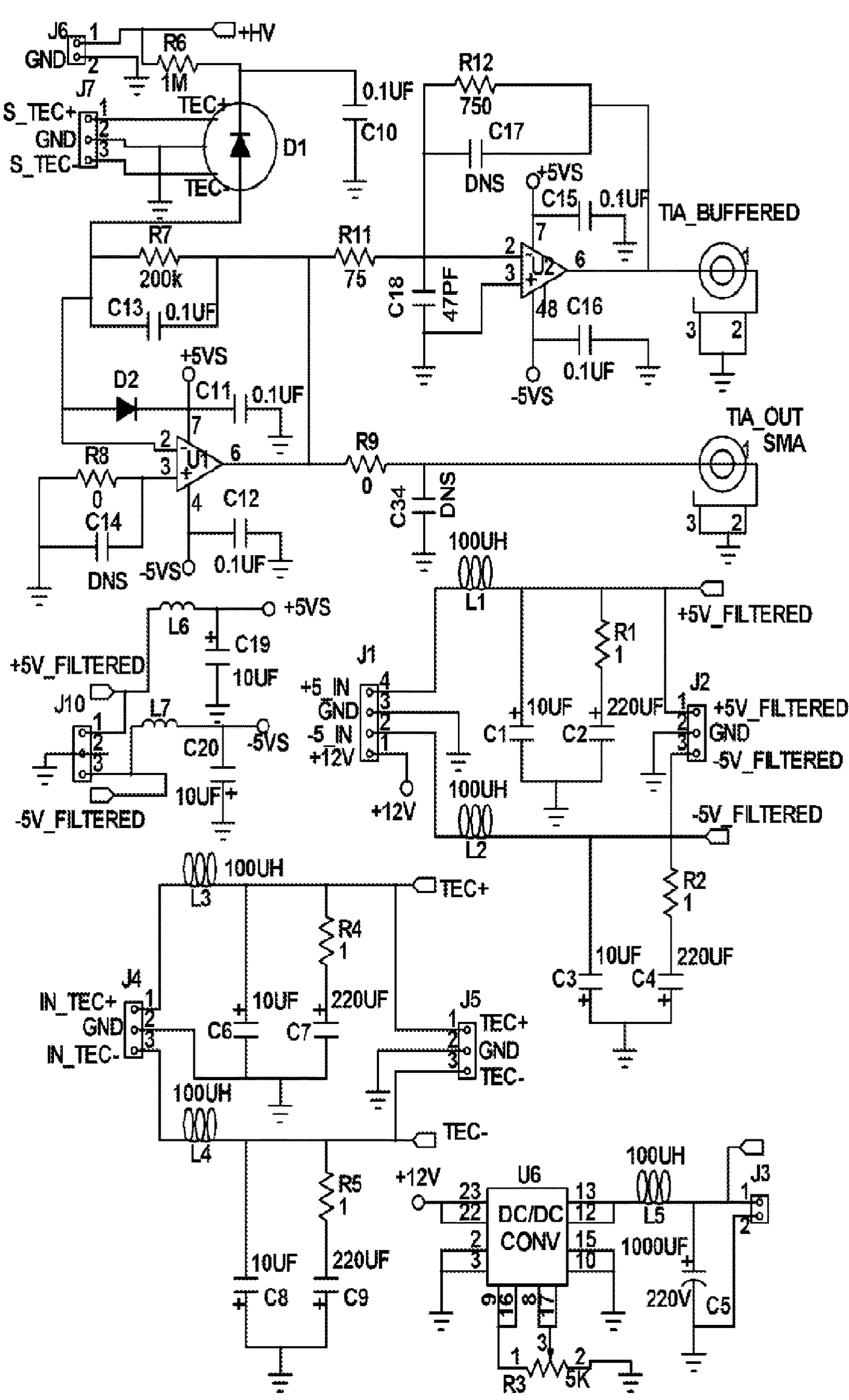

FIG. 11 is a schematic of the APD/TIA circuit.

Figure 12:
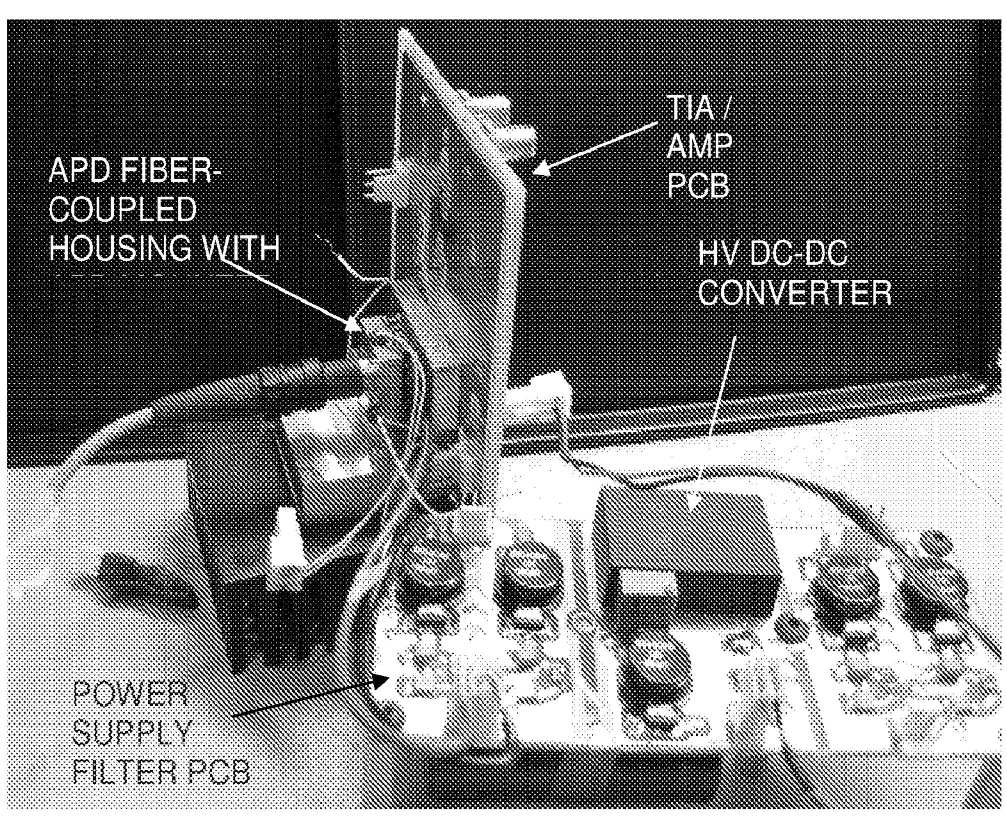

FIG. 12 is an illustration of an assembled APD circuit with APD, fiber coupled housing, TEC cooler, TIA/amplifier and Power Supply Filter PCB.

Figure 13A:
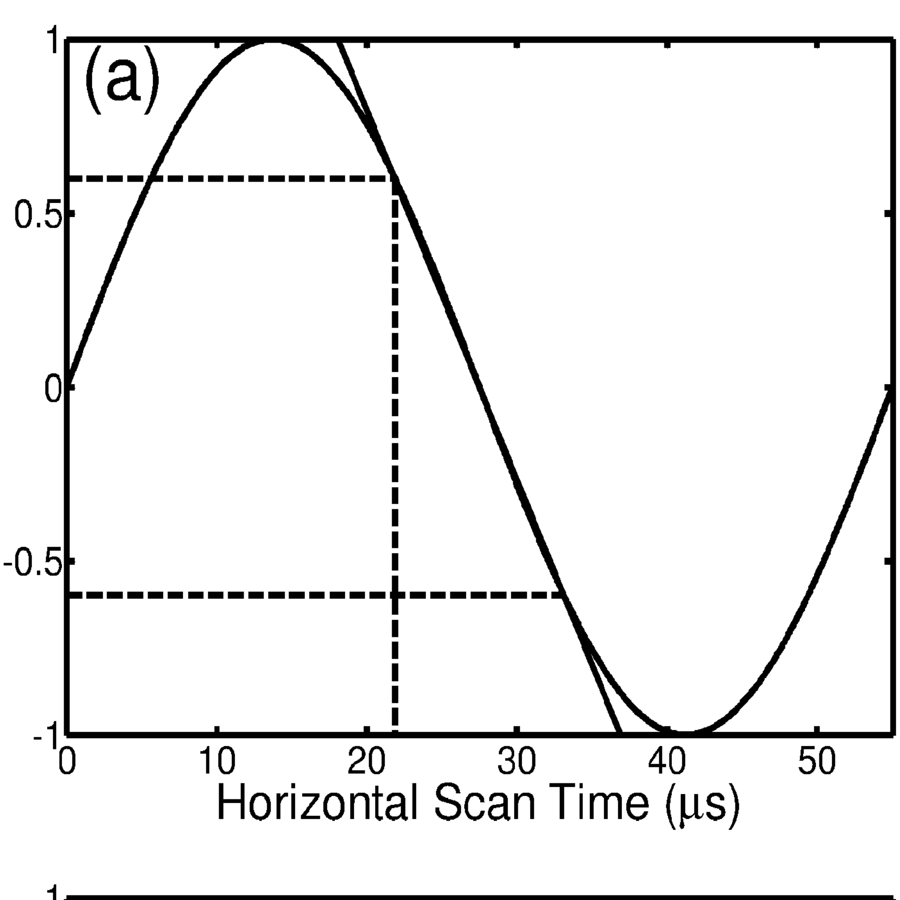

FIG. 13A illustrates a high-frequency horizontal sweep to drive the fast axis of the MEMS mirror.

Figure 13B:
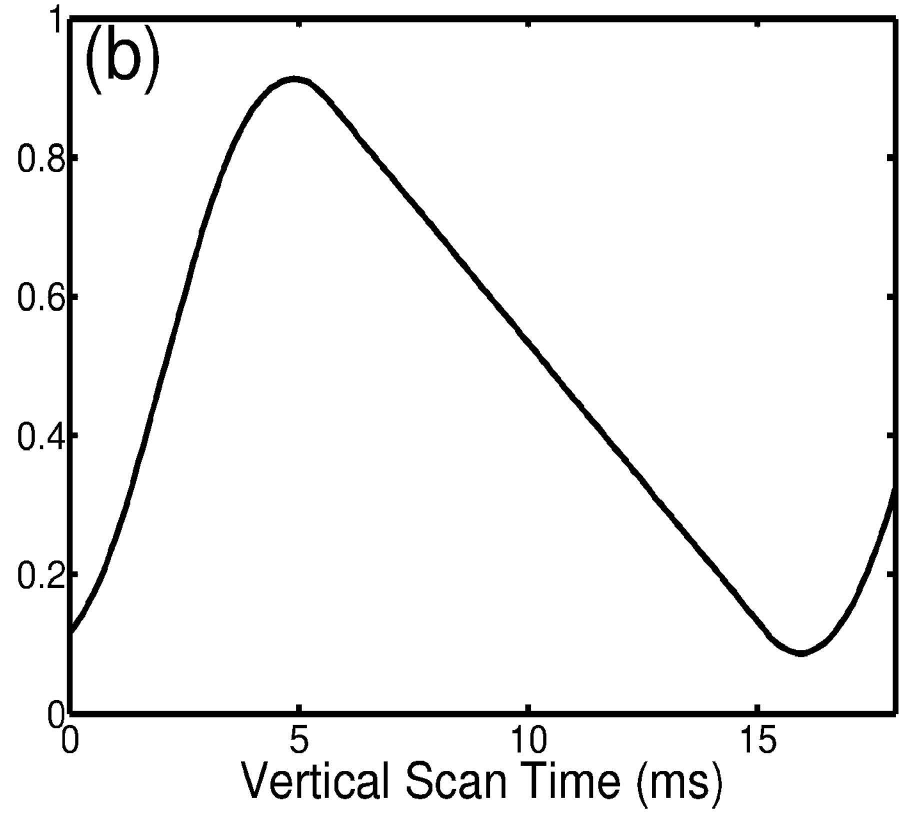

FIG. 13B illustrates a vertical sweep to drive the mirror slow axis.

Figure 14:
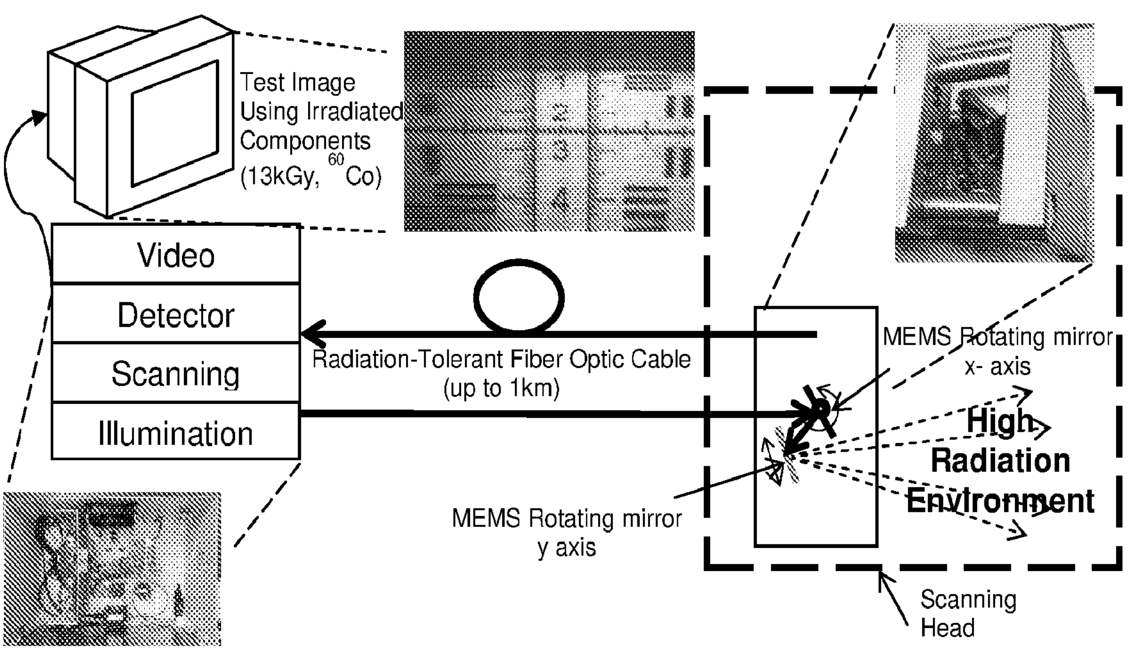

FIG. 14 is an illustration of a radiation hardened vision system that is capable of long-term monitoring in high radiation nuclear environments.

Figures 15, 16:
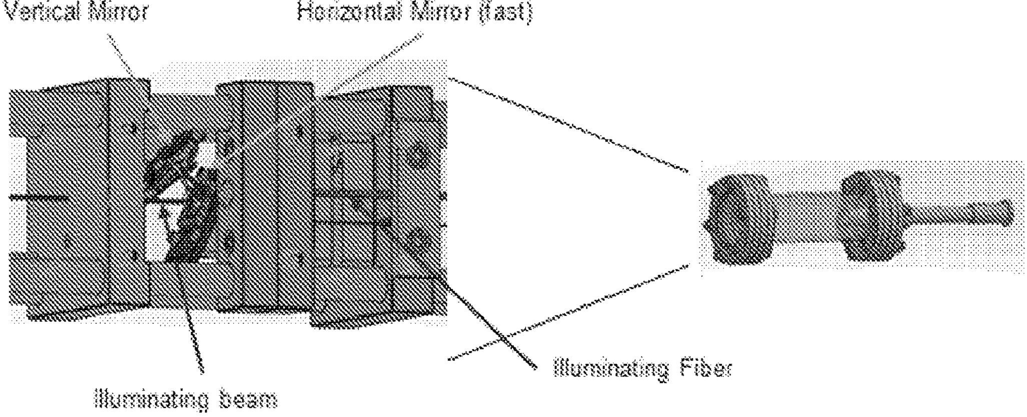

FIG. 15 is a diagram of a camera design using a photomultiplier tube as the active detector.

FIG. 16 is a mechanical design of the scanning head of the radiation-hard vision system with the optical assembly (left) and hermetically sealed housing (right).

Figure 17:
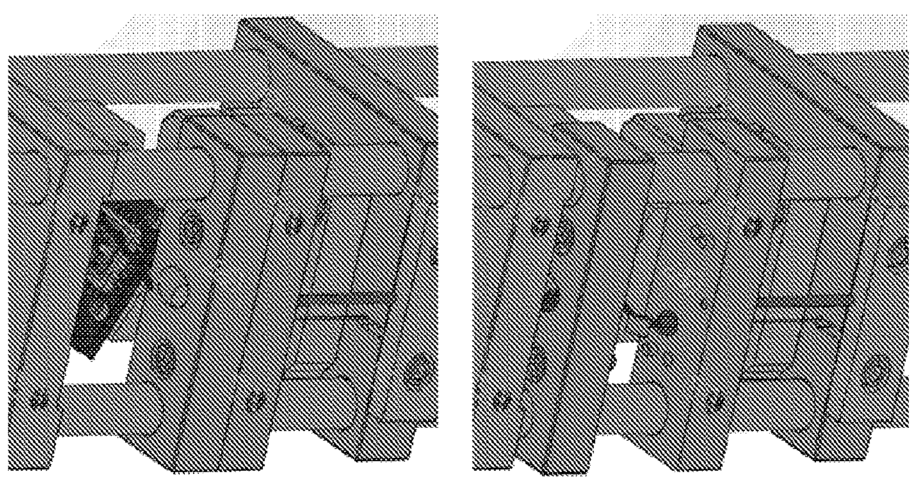

FIG. 17 is a mechanical illustration of the collimating lens, a sapphire ball, held between two plates in the optical assembly with an adjustment for the lens-fiber distance.

FIG. 18 illustrates a block diagram of a schematic of electronics including microprocessor and circuit board.

Figure 19:
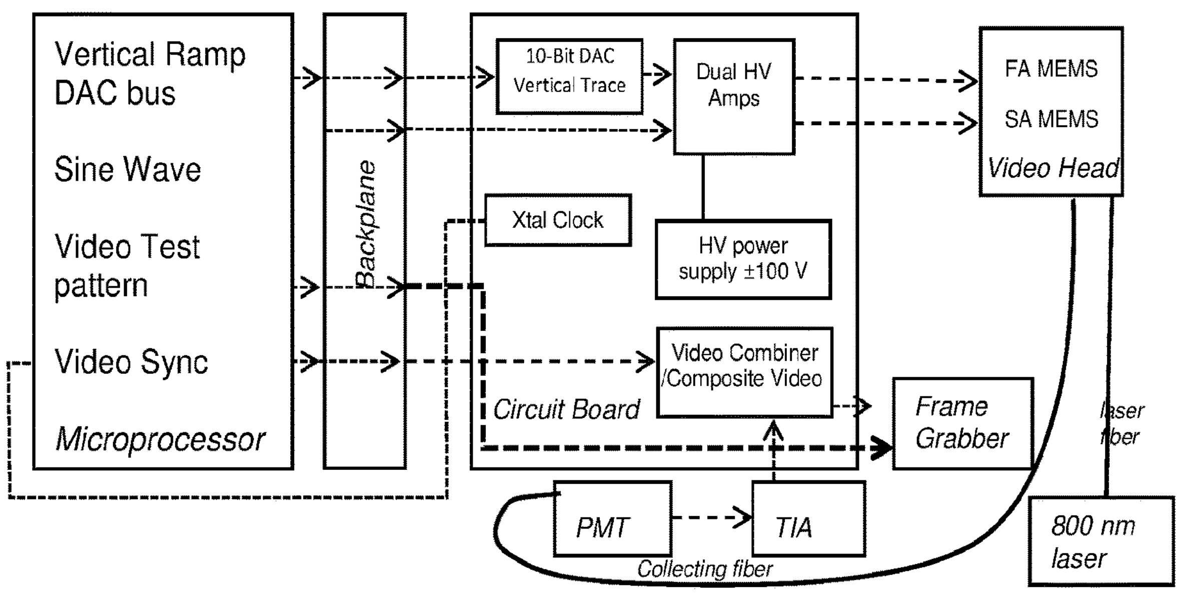

FIG. 19 is an image of circuit boards for the camera.

Figure 20:
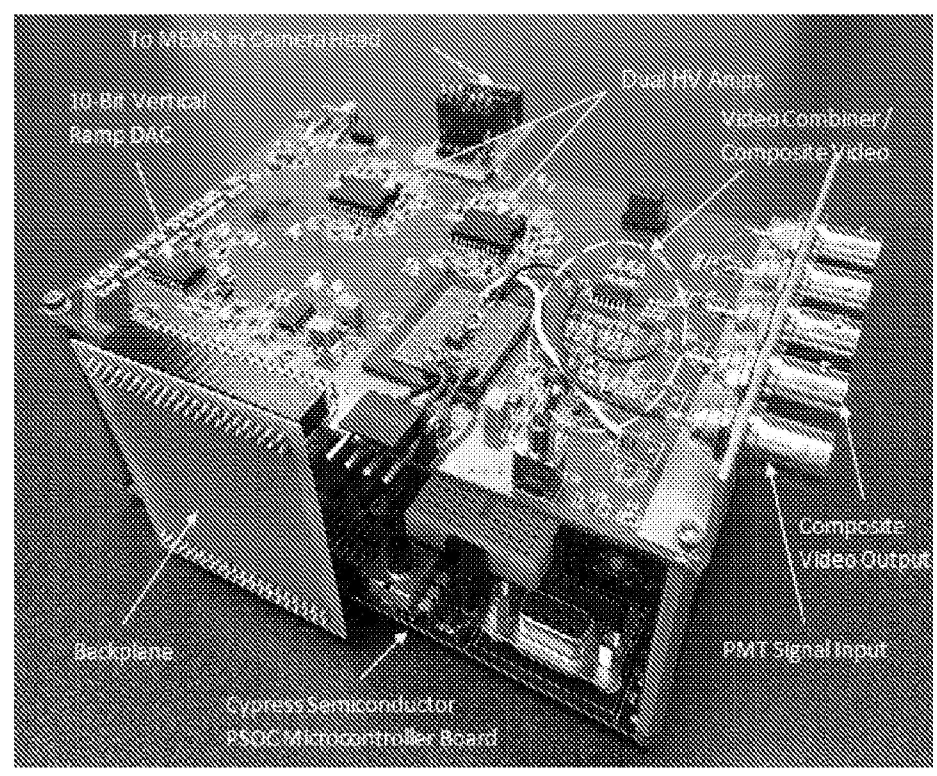
Figure 21:
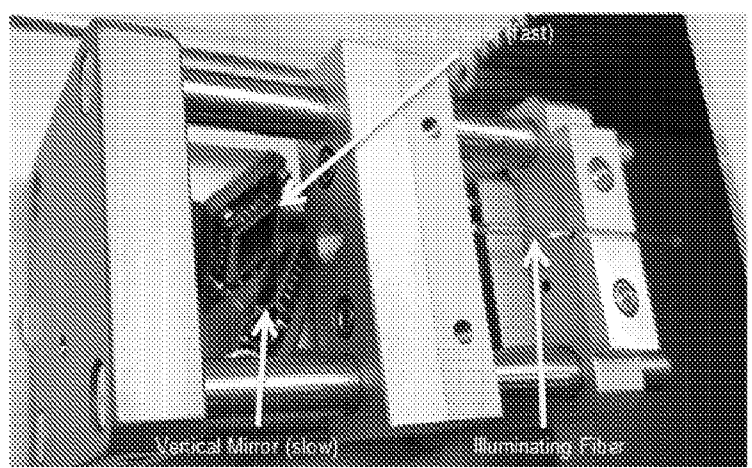

FIG. 20 is an image of the optical assembly that holds the two MEMS mirrors, the ingress and egress fibers, and collimating lens FIG. 21 is an image of the assembly that fits inside the housing.

Figure 22:
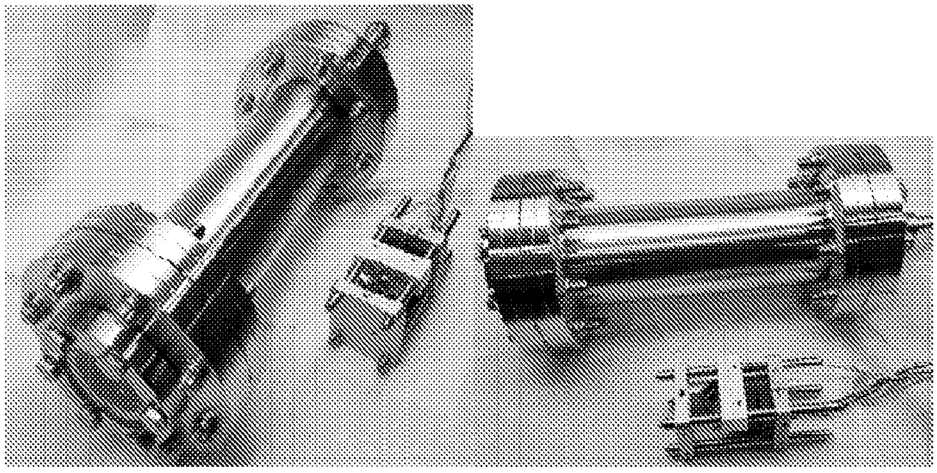

FIG. 22 is an image of the laser, photomultiplier tube (PMT), and associated electronics.

Figure 23:
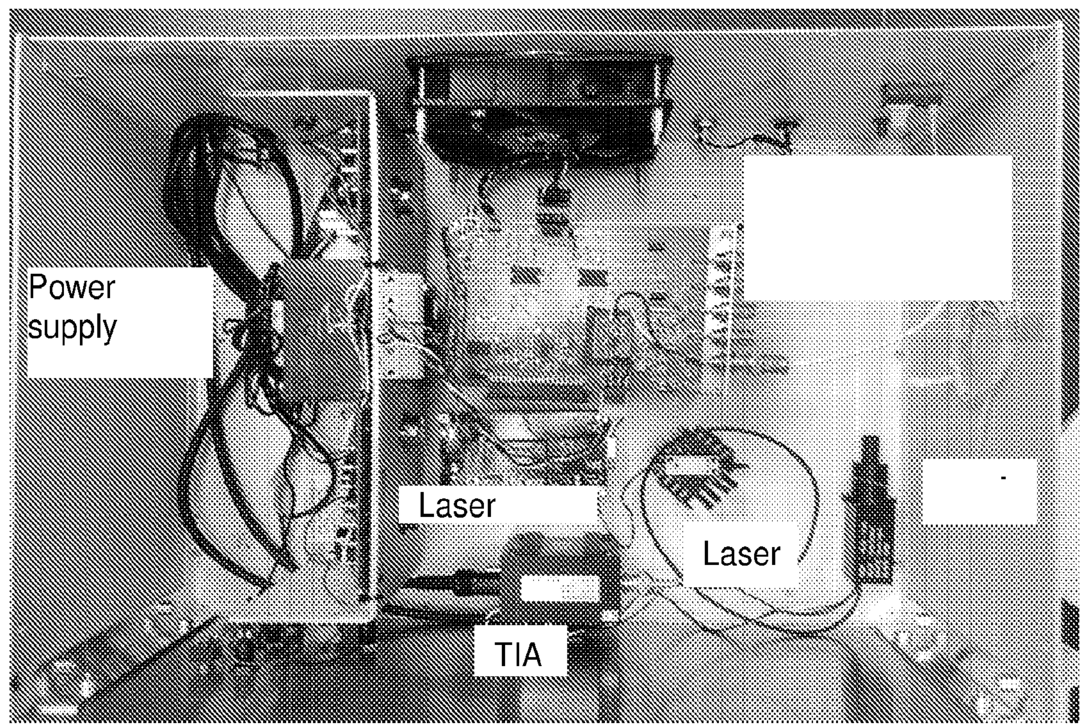

FIG. 23 is an image of the target adequate for radiation testing.

Figure 24:
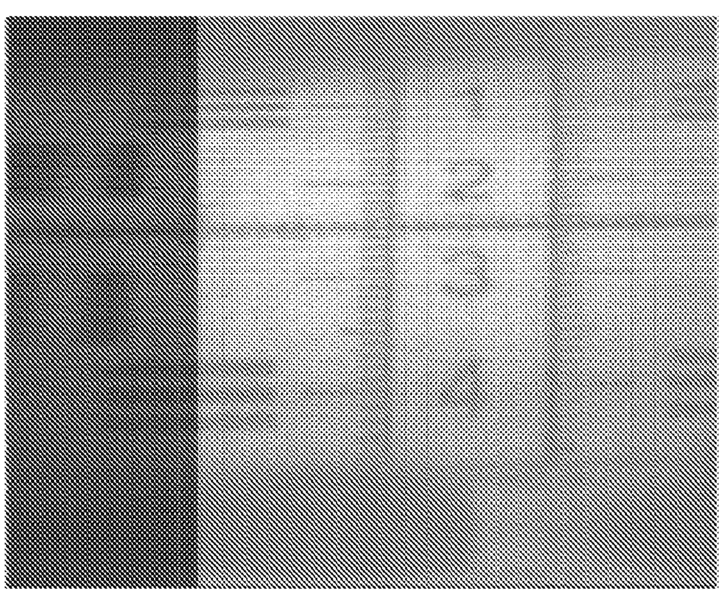

FIG. 24 is an image of a Cobalt-60 source producing gamma radiation at a rate of 150 Gy/hr.

Figure 25:
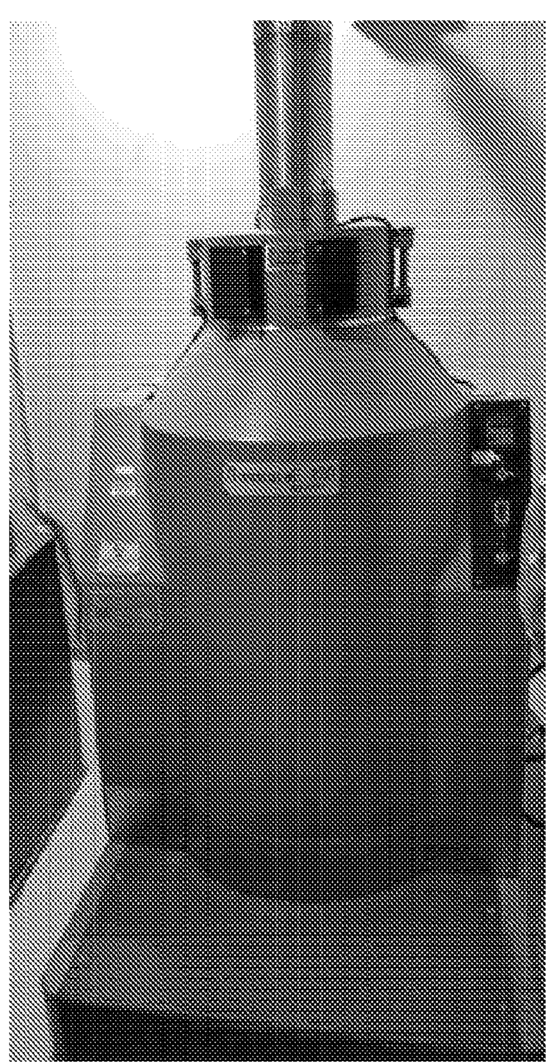

FIG. 25 is a flowchart of the Frame Grabber Viewer process.

Figure 26:
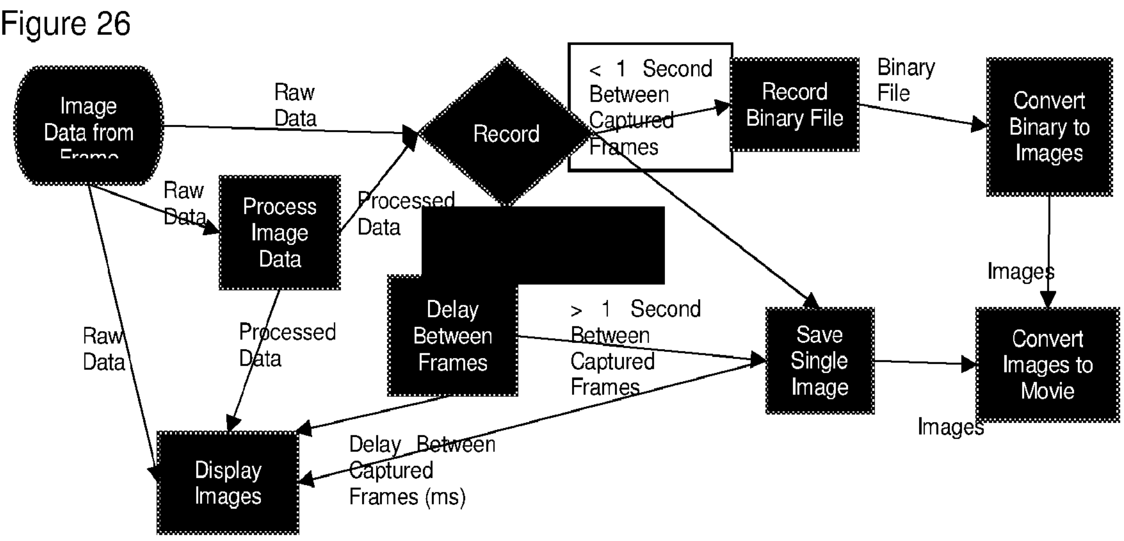

FIGS. 26 (*a*) and (*b*) illustrate the optomechanical assembly and a path of the laser beam using a collimating optic and folding mirror assembly to direct the beam onto the MEMS.

FIGS. 27 (*a*) and (*b*) Image of a test pattern with the camera. A single image (left) and an average of 10 images to reduce noise via the frame grabber software (right).

FIGS. 28 (*a*) and (*b*) Images taken 25° C. (a) and 100° C. (b) using the camera demonstrating that there is little to no discernable effect of temperature on image quality. The camera was held at temperature for 10 minutes to insure thermal equilibrium.

FIGS. 29 (*a*) and (*b*). Images taken during vibration (a) and post vibration (b). During vibration the image is blurred, however, post vibration there is no discernable effect on image quality.

FIGS. 30 (*a*) and (*b*). Images from a camera with MEMS mirrors irradiated with a total dose of 13 kGy at the gamma source. One of ten captured images with random noise (a). Average of 10 images to reduce noise (b). While these are improved over the images in FIG. 11, the improvement is likely due to differences in the cameras and setup and not because the MEMS were irradiated.

Figures 30A, 30B, 31:
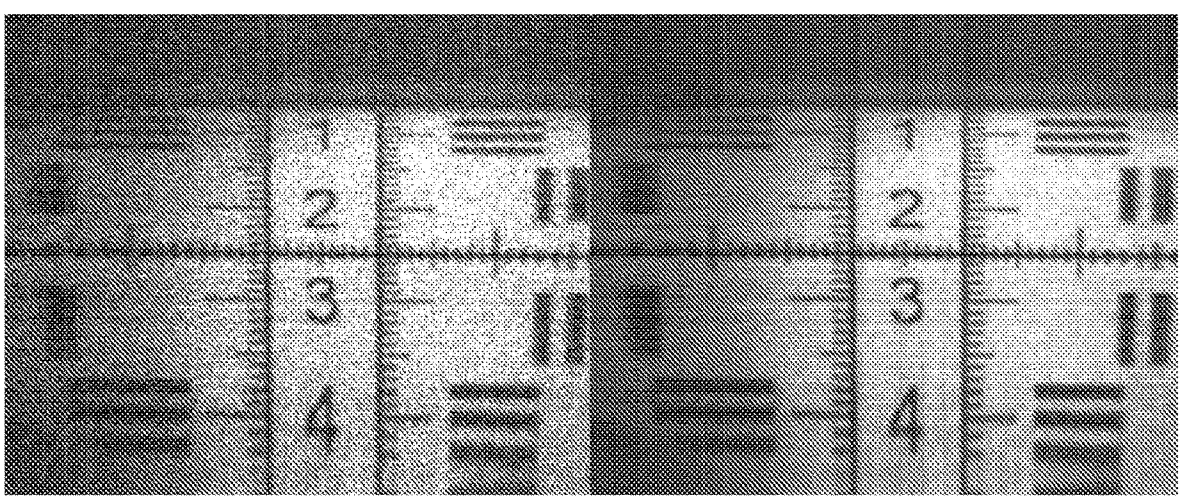

FIG. 31 is a table of the MEMS irradiation schedule.

VII. DETAILED DISCLOSURE OF MODES

Consider generally a camera system comprised of a camera head containing a scanning element. The scanning element is in communication with a separate, electronics element that controls the scanning element and that detects and reconstructs one or more images from a scanned scene. In some, but not all, cases, there is no active light source and/or no active detector that are part of the camera head. (An active light source is a light source requiring one or more electrical connections. An active detector is a detector comprised of a detecting element requiring one or more electrical connections.) Similarly, in some, but not all, cases, the camera head contains no elements comprised of field-effect transistors or p-n junctions. Rather, the camera head conveys the scanned image (field of view or scene) to the separate electronics element, e.g., an active detector located outside of the camera head; the image(s) is/are reconstructed by electronics connected to the active detector and/or by software to assemble a representative image of the scanned image(s). There can be a reconstruction of the scanned scene, such as a product, and the reconstruction can be printed if so desired, another manner of viewing a product. And of course, an apparatus can be a product of the process of making the apparatus.

Embodiments herein are illustrated with reference to the same target image shown in FIG. 1. The target has horizontal and vertical rulers, number text, and vertical and horizontal bars in each quadrant. The small lines on the rulers have 1 mm spacing.

Consider two kinds of illustrative embodiments: (1) an active scan system using a scanned laser beam to illuminate the scene and an unscanned optical fiber to detect the scattered light and convey the light to an optical detector; and (2) a passive scan system using an unscanned illuminator and a scanner to direct the scanned scene into an optical fiber detecting element.

(1) Active Scan Camera System

An active scan camera system can, but need not always, include: a camera head devoid of any active light source and/or devoid any active light detector, in particular embodiments, devoid of both the active light source and devoid of the active light detector; and control electronics, distal to the camera head, that comprises an active detector and an active light source; wherein the camera head contains: a scanning mirror system; at least one optical fiber that conveys light from the active light source to a scanned scene and conveys backscattered light from the scanned scene to the active detector; and wherein the control electronics comprises: a control that controls the scanning mirror, and electronics and software, arranged such that the control, the active detector, and the electronics and software cooperate to reconstruct a signal from the active detector of the scanned scene to produce a video signal, or an image signal, that is conveyed to the electronics to carry out reconstruction of the scanned scene.

(2) Passive Scan Camera System

The passive scan camera system can, but need not always, include: a camera head devoid of any active light source and/or any active light detector, in particular embodiments, devoid of both the active light source and devoid of the active light detector; and control electronics, distal to the camera head, that comprises an active detector; wherein the camera head contains:

a scanning mirror system; at least one optical fiber that conveys backscattered light from the scanned scene to the active detector; and wherein the control electronics comprises:

a control that controls the scanning mirror, and electronics and software, arranged such that the control, the active detector, and the electronics and software cooperate to reconstruct a signal from the active detector of the scanned scene to produce a video signal, or a video signal, that is conveyed to the electronics to carry out reconstruction of the scanned scene.

Active Scan Camera System

Generally, the scanning fiber-optic based vision system can use radiation hardened optics and radiation hard optical fiber, such as hollow-core Photonic Crystal Fiber (PCF), to mitigate radiation induced absorption of the optical fiber. Hollow-core PC fiber is fabricated as a photonic crystal silica cladding layer with an 'air' core. There is no fiber darkening where most of the light is guided, and the optical losses can be reduced by a factor of about 30 to 100 over conventional fiber optic cables.

An embodiment scanning vision system has been designed as a vision system for high radiation environment, implementations of the vision system were built using the design, and implementations were radiation tested. Three implementations of the scanning vision system were investigated, each with hollow core PCF fiber and regular 50 μm multi-mode (MM) fiber. It was found that commercial radiation-tolerant fibers have low loss in high radiation environments with the same optical coupling characteristics as standard optical fiber. Thus, the use of standard commercial rad-hard MM fiber is a useful design variant.

Choice of Scanning Mirror

Based on size, speed, and convenience, a benchtop embodiment used a MEMS 2-axis mirror. A Mirrorcle Technologies MEMS development kit included 3 MEMS mirrors, drive electronics, an interface to a personal computer, and software (including a software development kit for Matlab, Labview, and C++). Two of the MEMS mirrors were 1.2 mm in diameter, and one had a 3 mm mirror. The benchtop embodiment allowed relatively easy changing of the MEMS devices. Measurements reported below were all made with the 3 mm mirror device. This system was convenient to use.

Mirrors, although faster than galvanometer-based systems, were slow for real-time video imaging, so single still images were best acquired with this implementation—in contrast with real time video images using faster MEMS devices. Additionally, the MEMS development kit comes with a National Instruments DAQ module which is used to drive the MEMS mirrors. This module also has a high-speed, analog-to-digital converter (ADC) which can be used to digitize the signal coming from the optical detector unit. A Matlab program was written to drive the mirror in a raster pattern and simultaneously record the signal coming from the optical detector unit, thereby reconstructing the image.

Choice of Radiation-Tolerant Fiber

A hollow-core PCF fiber is not the only optical fiber that would be sufficiently radiation-tolerant for use in nuclear energy applications. The reason that standard optical fibers suffer radiation-induced optical loss is because the fiber cores are intentionally doped with phosphorous which is known to be the cause of radiation induced attenuation (RIA). Specialty fibers have been developed that are doped with fluorine instead of phosphorous and show minimal RIA even after an accumulated dose of 200 MGy. Further, the RIA appears to reach saturation at this dose and may not substantially increase for even higher doses. Both fluorine-doped multi-mode fiber with 50 μm core and single mode fiber with 9 μm core are now commercially available. These fibers have a large spectral window compared to PCF fiber, are less expensive, and are a reasonable choice for use in high radiation environments where total doses are expected to be below 200 MGy and possibly higher. Hollow-core PCF fiber can be used for higher dose applications.

The hollow core PCF fiber used in the different embodiments is HC-800-02 manufactured by NKT Photonics. This fiber supports a single optical mode of 5.5 μm diameter, has an NA=0.2, and will guide wavelengths between 770 nm and 870 nm. It is a lossy fiber at 2.5 dB/10 meters. Less lossy fibers with ~0.2 dB/10 meters are available at longer wavelengths and may be necessary for longer distances. Generally, there is better performance from the multi-mode fiber than the PCF fiber, both because of the core size and the spectral response differences.

Choice of Focusing Optic

A refractive optic (a lens) was used for these implementations because of ease of handling and aligning. Although a curved mirror is more radiation-tolerant, refractive lenses can be fabricated in highly radiation-tolerant materials such as sapphire, borosilicate glass containing $CeO_2$, and even synthetic quartz, all of which can handle cumulative radiation doses in excess of 205 MGy.

Choice of Optical Detector

For a scanned system, the detector can have a high gain, high speed, and low noise, especially in video applications because the detector spends a minimal stare time at each pixel. For instance, in a standard 640×480 video system running at 60 frames per second, the detector stare time for each pixel is 54 ns. In contrast, in an arrayed imaging device such as a CCD or CMOS image sensor, each pixel spends 1 frame-time collecting light, resulting in a stare time of about 16.7 ms. Thus, the detector in the scanned system has a stare time that is $3\times10^6$ less than that of a CCD image sensor and has a bandwidth of at least about 18 MHz compared to the CCD at 60 Hz. In addition, the light gathering power of a fiber is limited compared to a standard camera lens used on a CCD video system which typically has an f/#~1/2.8 whereas a typical PCF fiber has a numerical aperture NA=0.2, which corresponds to an f/#~1/10. Also, PCF fiber essentially transmits light over a narrow wavelength range, further limiting the number of photons reaching the detector.

Thus, one can use an avalanche photodiode (APD) which has high internal gain coupled with a transimpedance amplifier (TIA). All the measurements made with the benchtop embodiments were done with a commercial APD detector board, a Hamamatsu C5460-01. This unit has an APD internal gain of 30 and a transimpedance gain of 10 M2, corresponding to a photoelectric sensitivity of $1.5\times\mathbf{10}^8$ V/W. However, with this high a transimpedance gain, the bandwidth is limited to about 100 kHz.

Image Acquisition Time

Because of the lower bandwidth of the APD circuit and the slower MEMS mirrors that were commercially available, image resolution was set at 320×240, and an image acquisition time was 3.8 s.

IMPLEMENTATION EMBODIMENTS

Figure 4A:
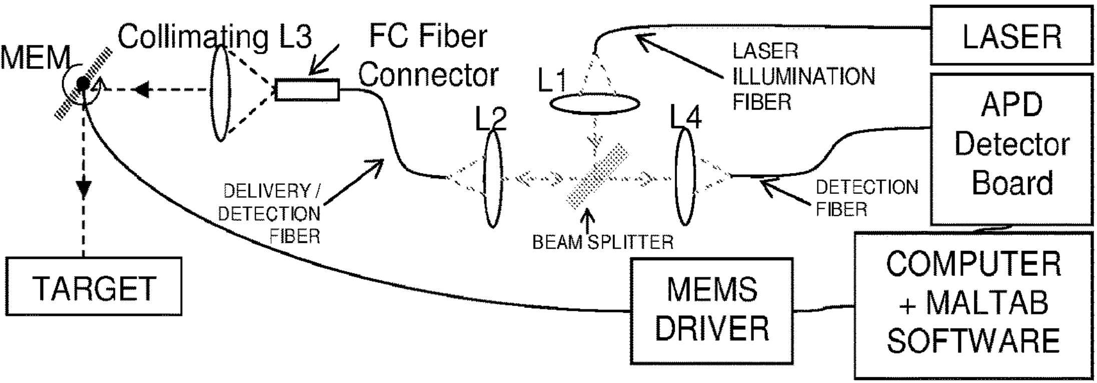
FIG. 4A is a diagram of a single rad-hard fiber, laser-illuminated/scattered light embodiment.
Figure 4B:
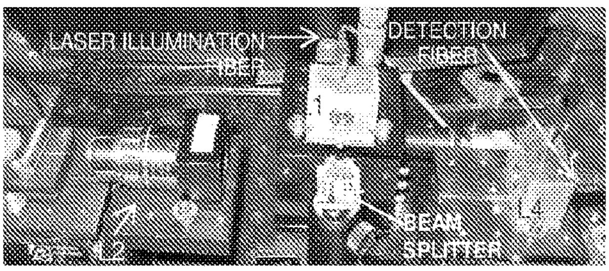
FIG. 4B is an image of a single rad-hard fiber, laser-illuminated/scattered light embodiment.

Three basic embodiments were developed and built to compare different methodologies for the scanning vision system:

1. a white-light illumination embodiment using a single rad-hard fiber (FIGS. 2A and 2B),
2. a dual rad-hard fiber laser-illuminated/scattered light embodiment (FIGS. 3A and 3B and C),
3. a single rad-hard fiber laser-illuminated/scattered light embodiment (FIGS. 4A and 4B).

Embodiment 1. White-Light Illumination Embodiment

Figure 1:
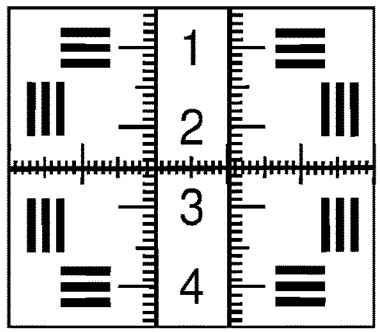
FIG. 1 is a target image.
Figure 2A:
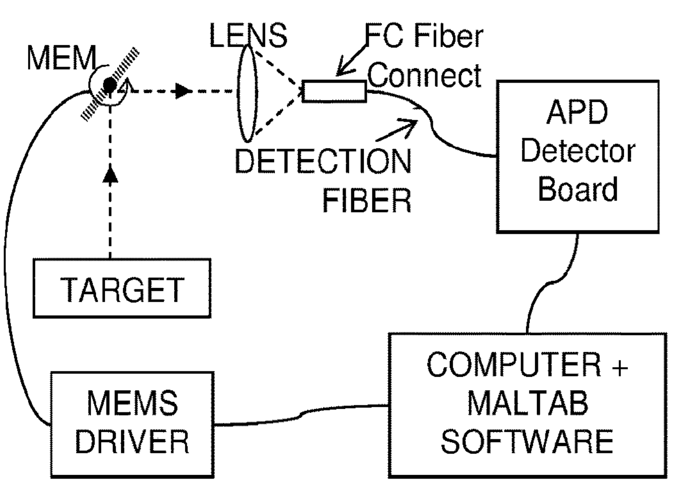
FIG. 2A is a diagram of a white-light illumination embodiment using a single rad-hard fiber.
Figure 2B:
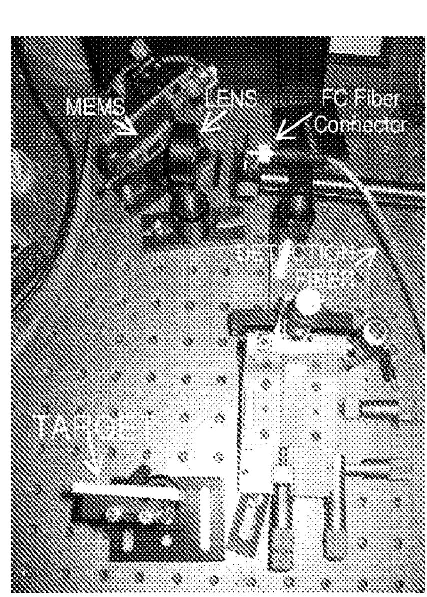
FIG. 2B is an image of a white-light illumination embodiment using a single rad-hard fiber embodiment.

In the first embodiment, white light is used to illuminate the object or target (FIG. 1). Referring to FIGS. 2A and 2B, light from the target is deflected by a MEMS mirror (in this particular case, 45°) to a lens which focuses the image of the target onto an image plane. The connectorized end of the fiber is placed in the center of the image plane and the MEMS mirror raster scans the image plane across the fiber end. Collected light from the fiber is detected by a high-gain avalanche photodiode circuit (APD). The voltage output of the APD detector board is simultaneously recorded with the raster scanning of the MEMS as described earlier to construct the image. This embodiment is the simplest to implement and uses a single radiation-tolerant fiber. Both multimode fiber and hollow-core PCF fiber were tested in this embodiment.

Embodiment 2. Dual Fiber Laser-Illuminated/Scattered Light Embodiment

The second embodiment is shown in FIGS. 3A and 3B. Light from a fiber-coupled laser is focused onto the target by the lens by way of the MEMS mirror. The MEMS mirror raster-scans the focused beam across the target. Scattered light is collected by the detection fiber whose output is connected to a high-gain avalanche photodiode circuit (APD). For rad-hard environments this would use that both the illumination fiber and the detection fiber be radiation-tolerant fibers. Both multi-mode fiber and hollow-core PCF fiber can be used in this embodiment.

Note that the detection fiber does not have a lens incorporated in it. At first glance, one might think that a detection lens would help this situation by improving the light gathering power of the detection fiber. In reality, it reduces the collected light. This is because the detection fiber is stationary while the laser is scanned across the target. A detection lens would focus the illuminated image of the target onto the plane where the input of the detection fiber is located. Light from one small point of this image plane would then be collected by the detection fiber. In contrast, without a detection lens scattered light from any laser-illuminated point that travels in the direction of the detection fiber will be collected as long as the light is within the acceptance angle of the detection fiber. This is further discussed below.

Embodiment 3. Single Fiber Laser-Illuminated/Scattered Light Embodiment

The third embodiment is shown in FIGS. 4A and 4B. Light from a fiber-coupled laser is collimated by lens L1, 4% of which is deflected by a 4%/96% beam splitter to lens L2 which couples the light into a radiation-hard fiber (PCF fiber shown here). Lens L3 focuses the light from this fiber which is deflected by the MEMS onto the target. The MEMS mirror raster-scans this input beam across the target. Scattered laser light is directed by the MEMS mirror back into L3 which couples the scattered light back into the PCF fiber. This scattered light then is collimated by L2 with 96% of the light passing through s beam splitter coupled into the detection fiber by L4. The detection fiber is connected to a high-gain avalanche photodiode circuit (APD).

Figure 5:
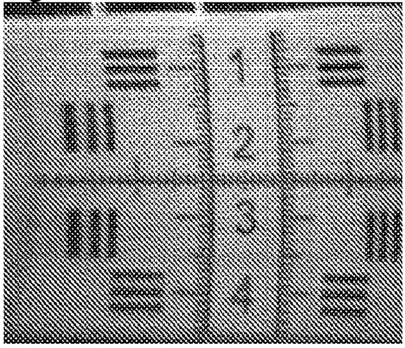
FIG. 5 is an image of a target produced by a single rad-hard fiber laser-illuminated/scattered light embodiment using a single rad-hard fiber an embodiment.

FIG. 5 is a scanned image of the target taken with the white light illumination embodiment of FIG. 2 with 50 μm MM fiber. Although the overall resolution is good, there is some distortion, due to geometrical effects of tip/tilt mirror systems such as in a MEMS mirror or 2D galvanometer mirror system. This is due to beam path distortion and is worse for steeper angles between the beam path and the mirror. In this embodiment the angle of incidence is 45°. (See FIGS. 6A, 6B, and 6C.) In essence, there would be no distortion if the target was the surface of a sphere centered on the MEMS mirror axes of rotation. These distortions can be mathematically compensated.

There also is another artifact in the image: light horizontal bars. These bars have a period of about every 10 scan lines and appear to be electronic in nature and appear to be the result of noise from the drive and collection electronics. The bars may also be related to a beat frequency between the mirror horizontal scan rate of 64 Hz and the 60 Hz power line frequency.

There was insufficient light coupled into the fiber to see an image utilizing the hollow core PCF fiber. Since the optical mode size is 5 μm, one would expect a reduction of coupling of ~100× compared to the 50 μm multimode fiber. In addition, the PCF fiber transmits a narrow wavelength band from about 770 nm to about 870 nm, further reducing the amount of light available to be detected. Because of this, the embodiment 2 was used with laser scanning.

Figure 6A:
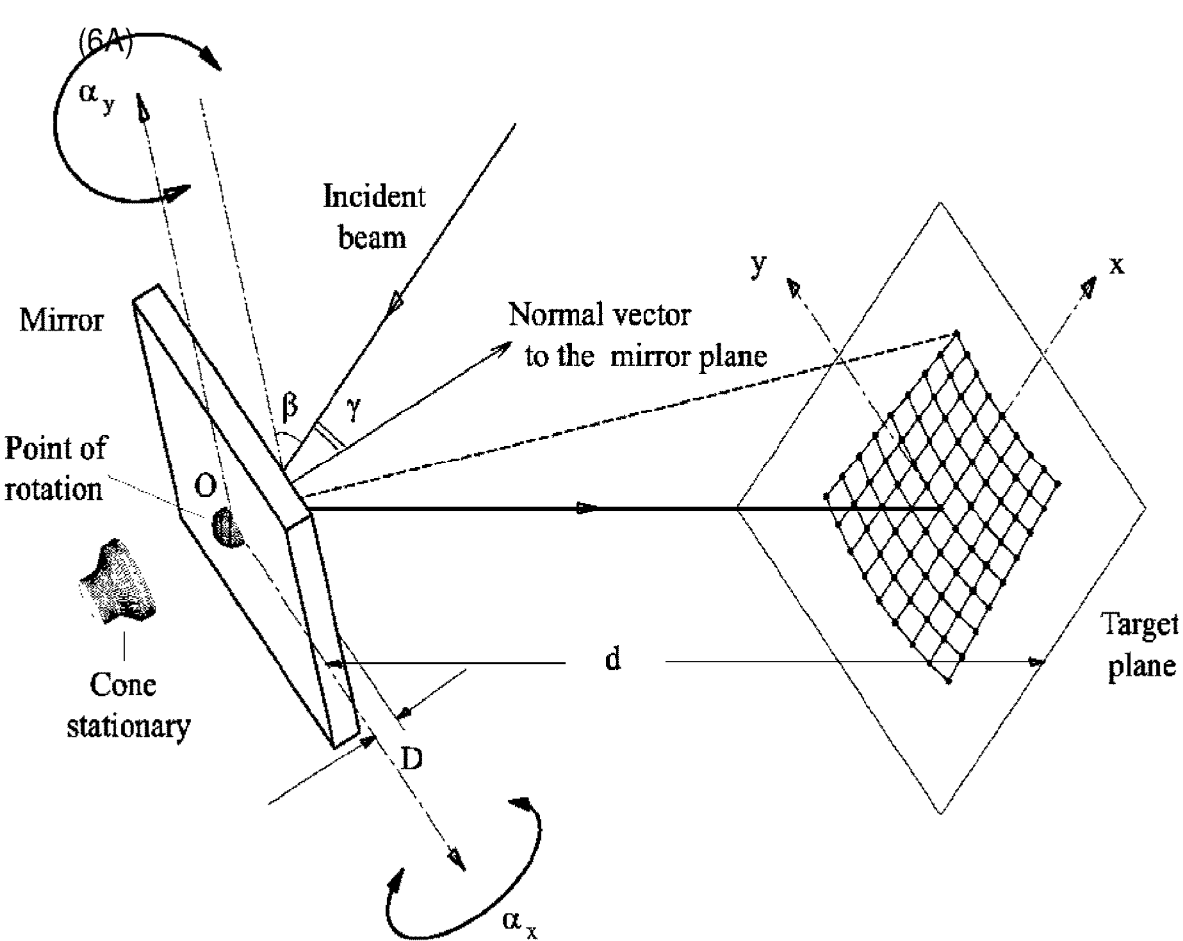
FIG. 6A is a diagram of beam path distortion effects for tip/tilt mirror systems.
Figure 6B:
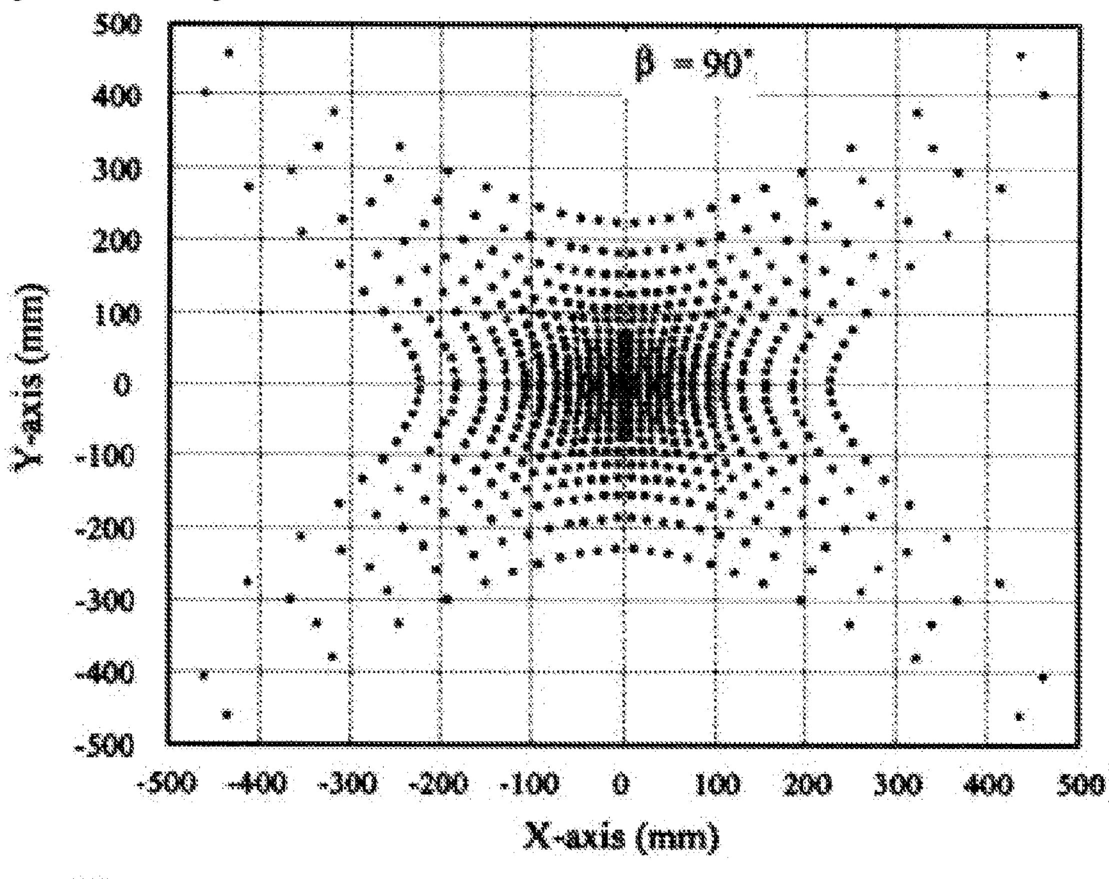
FIG. 6B is a graph of beam path distortion effects for tip/tilt mirror systems.
Figure 6C:
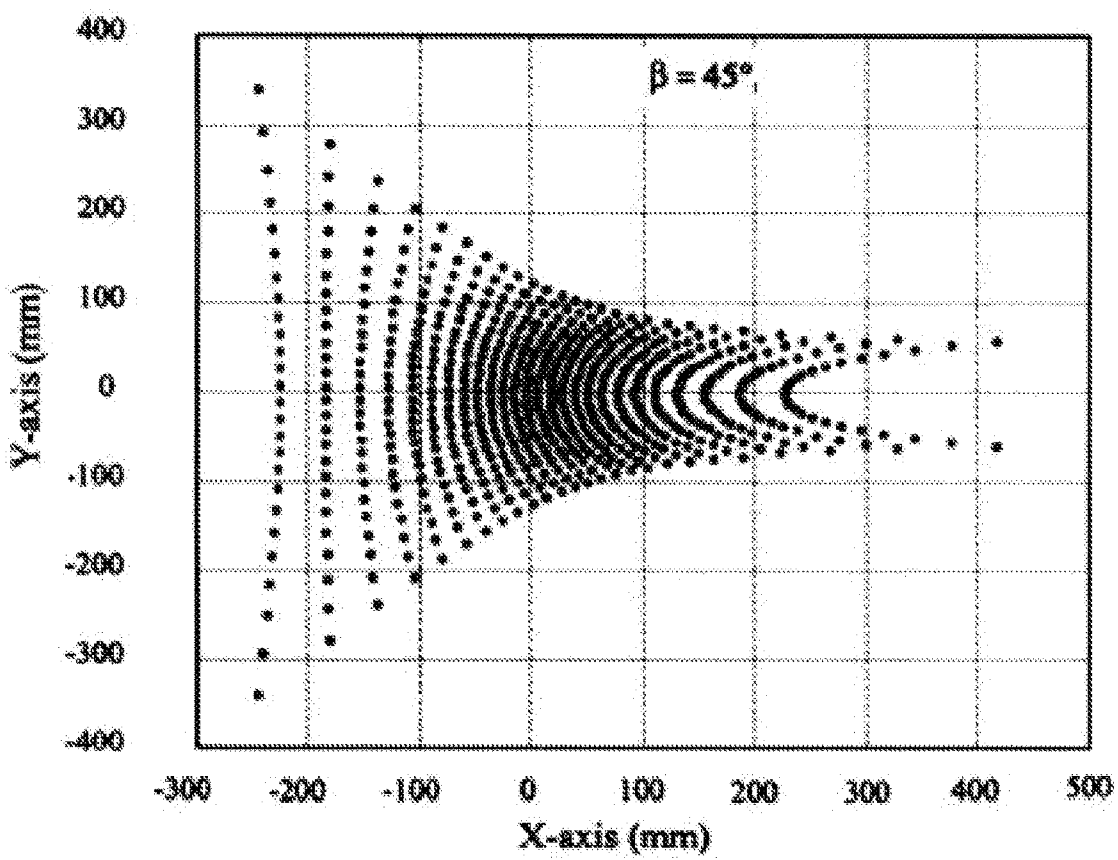
FIG. 6C is a graph of beam path distortion effects for tip/tilt mirror systems.

Attention is drawn to FIGS. 6A, 6B, and 6C. FIG. 6A illustrates beam path distortion effects for tip/tilt mirror systems such as a MEMS mirror. The distortion is minimal and symmetrical for incident angles normal to the mirror as in FIG. 6B whereas the distortion is exaggerated for angles such as at FIG. 6C 45°.

For embodiment 2, FIG. 7A is a laser-scanned image of the target (FIG. 1) taken with the Dual Fiber Laser-Illuminated/Scattered Light Setup of FIG. 3 with a 50 μm MM fiber detection fiber placed 6 inches from the target. The same beam path distortions are seen in this image as in the previous setup of embodiment 1. To increase the amount of light captured, the detection fiber was placed about 3 inches from the target. The resulting scan shown in FIG. 7B. Although the image is brighter, a circular portion of the image is visible because light scattered from the target at other positions was outside the capture angle of the fiber.

Using a hollow core PCF fiber, FIG. 7C shows a laser-scanned image with the PCF detection fiber placed 6 inches from the target. The same beam path distortions are seen in this image as in the previous setup. When the detection fiber was placed about 3 inches from the target the resulting scan shown in FIG. 7D is brighter. However, a circular portion of the image is visible because light scattered from the target at other positions was outside the capture angle of the fiber. In sum, FIG. 7A-D has images of target taken with the Dual Fiber Laser-Illuminated/Scattered Light Setup of FIG. 3 with 50 μm MM fiber. FIG. 7A 50 μm MM detection fiber 6 inches from target; FIG. 7B 50 μm MM detection fiber 3 inches from target; FIG. 7C Hollow core PCF fiber 6 inches from target; FIG. 7D Hollow core PCF fiber 3 inches from target.

Embodiment 3 did not form an image because of optical cross talk: reflections off the components were larger than the signal coming from the detection fiber. Reduce the cross talk to −35 dB, and the estimated signal would be down ~−60 dB. With modification, this embodiment should be viable. Changes to be made are (i) obtain lenses with anti-reflection coatings at the illumination laser wavelength; (ii) angle-cleave the delivery/detection fiber to prevent back-reflections; and (iii) consider using polarized light and wave plates to remove the reflected light.

Radiation Effects on Key Components

Optical fibers are primarily sensitive only to ionizing radiation, such as gamma radiation. Other high energy particles do create damage, but this is mainly due to the ionization effects from secondary particles. The radiation damage in optical fibers takes the form of radiation-induced attenuation (RIA) primarily due to the trapping of radiolytic electrons and holes at defect sites in the silica fiber, i.e., the formation of color centers. The color centers absorb the light at certain wavelengths, as shown in FIG. 8. FIG. 9 illustrates a typical spectrum of radiation-induced attenuation at 1 MGy (gamma) in pure silica core fibers with various OH and H2 concentrations. Note that the RIA is primarily centered in the visible range and becomes small beyond 750 nm. Note the radiation induced absorption measurements versus total ionizing dose from a Co-60 gamma radiation source with a dose rate of 22.5 kGy(Si)/hr. All of the optical fibers were commercial, multi-mode optical fibers (50 μm core) measured at 850 nm. The temperature of the fiber was ~70° C. The results indicate a very low RIA for the Draka RHP-1 optical fiber (F-doped) with 0.067 dB/m RIA at 650 kGy(Si).

Extrapolating the results allows an estimate of the total dose for a vision system. For a radiation induced total power loss of 10 dB, with a 4 m-long fiber (long enough to penetrate a fuel rod assembly for internal inspection), at 850 nm the Draka RHP-1 fiber is projected to have a total dose limit of 200 MGy(Si), which is over 200× higher than the standard vidicon based tube system. If a commercial (NKT) PCF fiber is used with the losses specified in the NKT data sheets at 850 nm, the projected maximum radiation dose is 4.5 GGy, or 4500× greater than the standard vidicon tube. (Multimode Fibres, 22.5 kGy/hr).

FIG. 9 is a plot that shows the RIA obtained as a function of integrated dose for the four multimode fibers tested at a dose rate of 22.5 kGy(Si)/hour. The green curve is for Draka-1, the red curve is the Infinicor SX+. The black and blue curves are for Draka-RHP-1 and Draka RHP-2 respectively.

MEMS Radiation Tolerance

Evaluating radiation hardness of a MEMS component is a more complicated matter than that of an optical fiber. The radiation hardness of the MEMS depends fundamentally on its specific device structure and mechanism of electromechanical operation. Although some generalizations can be made for certain types of MEMS, as described below, it is usually more prudent to consider the particular MEMS structure when evaluating radiation hardness. For purposes of evaluating radiation hardness, MEMS can be categorized in to three basic types based upon their electromechanical operation:

1. Electro-static—where the mechanical action is driven by electrostatic forces across a dieletric—Radiation Harness: Potentially very high, but device structure dependent.
2. Electrothermal—where the mechanical action is a result of thermal expansion of the material from heating silicon, polysilicon, or other deposited resistive films—Radiation Harness: Usually extremely high.
3. Electromagnetic—where the mechanical action is a result of an electromagnetic field produced by current in a wire loop patterned on the device—Radiation Harness: Usually very high.

Of these three basic types, the thermal MEMS and electromagnetic MEMS have been found to be highly immune to radiation, regardless of the specific device structure.

The MEMS radiation hardness can be quite good. MEMS can be affected by a number of types of radiation, including neutron, proton, electron and gamma radiation. The usual effect of displacement damage to the MEMS is a slight change in the Young's Modulus (typically <0.5%), which alters its resonant frequency by an amount proportional to the change in Young's Modulus. Electrostatic MEMs can be affected by ionizing radiation in a manner similar to a metal-oxide-semiconductor-based device, but these effects can be minimized and in some cases completely eliminated with a prudent design that limits the effects of charge build-up at interfaces. With appropriate design, even electrostatic MEMS have exhibited radiation hardness up to 1 GGy, over 1000× more than a conventional vidicon camera tube. The radiation limits of thermal and electromagnetic MEMS can reasonably be expected to be even higher than 1 GGy.

Design For A Radiation-Hard Real-Time Video System

An embodiment for a radiation-hard real-time video system can, but need not always, include high velocity two-axis electromagnetic MEMS mirrors for real time video imaging. For example, Microvision, Inc., manufactures a MEMS scanning mirror-based laser projector, the SHOWWX, capable of displaying real time video at a resolution of 848×480 pixels per frame at standard video frame rates of 60 frames per second. The subassembly can contain the MEMS mirror, called the PICO-P projector, and can also contain 3 high-powered visible lasers.

A block diagram of the system is shown in FIG. 10. The system is composed of two major assemblies, the remote video head and the drive electronics case. The remote video imaging head contains the MEMS mirror and is connected to the case by way of the radiation-tolerant optical fiber and electrical drive signal cable. The case contains the MEMS drive electronics, APD/TIA detection assembly and electronics and software (or the equivalent to software carried out in hardware), which may be such as a video frame grabber for capture and display of the real time video.

A schematic of the APD/TIA circuit is shown in FIG. 11. There is detection circuitry, e.g., a APD a Hamamatsu S12053-10 mounted to a thermoelectric cooler (TEC). The APD is biased to a high voltage (HV) power supply formed by the DC-DC converter U6, capable of stepping up a 12-volt input to up to 200V. The anode of the APD is connected to a TIA formed by U3 and to gain resistor R14. U3 is an OPA657 low noise FET-input op amp with 1.6 GHz bandwidth. The voltage output of the TIA is connected to a voltage amplifier formed by U4, another OPA657 with voltage gain G=R16/R17. The output of this amplifier is connected to the input of the commercial video frame grabber, an EPIX 301. In the electrical schematic of FIG. 11, the anode of D3 the APD is fed into a high speed, high gain TIA formed by U3 and gain resistor R14. The TIA is followed by a voltage amplifier formed by U4 with gain G=R16/R17. The APD is cooled by a TEC cooler. High voltage bias is applied to the APD by way of the step-up DC-DC converter U6. All power supplies are heavily filtered to reject spurious electrical interference.

To obtain the desired sensitivity, the APD can be cooled to low temperatures. At room temperature, this APD has a low dark current ipc ~ 200 pA. Further, at a bias voltage of 150V the APD internal gain is $G_{APD}$ ~50. By lowering the temperature to −20 C with the TEC, the dark current reduces to ~2 pA and the gain increases to ~500-800.

The APD circuit and power supply filters have been laid out, fabricated (see FIG. 12) and have been tested. Because of the high bandwidth and high gain, the TIA circuit tends to oscillate. FIG. 12 illustrates an assembled APD circuit with APD, fiber coupled housing, TEC cooler, TIA/amplifier and Power Supply Filter PCB.

Electromagnetic MEMS mirrors can be used as they are rad-hard and use low drive voltages (<4V) and drive current (<30 mA). Two sets of drive signals can be used, one for the high frequency horizontal sweep to drive the fast axis of the MEMS mirror [FIG. 13(*a*)] and one for the vertical sweep to drive the mirror slow axis [FIG. 13(*b*)]. The fast axis of the MEMS mirror is driven in resonance by the horizontal signal which is a sine wave. The image pixels are sampled during the linear-most portion of the sine wave (60% of the sine wave). Since the signal is a sine wave, both the positive and negative-going slopes represent odd and even horizontal scan lines. The slow axis is driven by a sawtooth ramp to generate the vertical scan. Approximately 25% of the sawtooth is taken up by vertical retrace.

There are coils inside the MEMS mirror which are used to generate the magnetic field to tilt the mirror. The horizontal fast axis has a typical impedance ~100Ω with a full-scale mirror tilt of +15° when driven with a ±24.5 mA signal. Similarly, the slow axis has an impedance ~250Ω with a full-scale mirror tilt of ±10° when driven with a ±15 mA signal. These signals can be straight forward to generate, e.g., with a microcontroller and some external hardware so as to keep the signals in sync.

The laser driver circuit has a thermoelectric cooler (TEC) driver that is available as an IC, so a TEC drive circuit can be readily used. The video display uses a scanning signal able to drive a video monitor. If so desired, an appropriate video frame grabber card can be used with the MEMS mirror scanner. In particular, the MEMS mirror scans bi-directionally for the horizontal scan lines, while standard video is unidirectional, that is, each horizontal scan line scans left to right. The EPIX A310 is capable of being configured to handle either horizontal scan type. In addition, the software for the frame grabber can be capable of image processing for improved imaging. Note in FIGS. 13(*a*) and 13(*b*), each axis of the MEMS mirror is driven by a scan signal. (a) The fast axis of the MEMS mirror is driven in resonance by the horizontal signal which is a sine wave. (b) The slow axis is driven by a sawtooth ramp to generate the vertical scan. ~25% of the sawtooth is taken up by vertical retrace.

A high-definition, radiation hardened vision system that is capable of long-term monitoring in high radiation nuclear environments, such as for nuclear reactors, is illustrated in FIG. 14. The embodiment uses radiation-hardened fiber and shows image results. The scanning head within the high radiation environment laser scans an object under investigation using a radiation-insensitive mirror and scattered light from the object is collected by a radiation-hardened optical fiber. The laser beam is scanned by two single-axis rotating MEMS (micro electromechanical systems) mirrors. The embodiment targets radiation hardness doses of >200 MGy. The insets show the scan head with the test pattern (FIG. 1) produced by the head with irradiated MEMS to a total gamma ray dose of 13 kGy (60 Co), e.g., for use in methods pertaining to accident conditions (Fukushima, Chernobyl), in the nuclear reactor core during refueling or inspection and maintenance cycles (e.g., typically every 18 to 24 months), inspecting the internal condition of the steam generators of pressurized water reactors, and in hot cell radiation materials handling.

Consider now another scanning fiber-optic based vision embodiment using rad-hardened components—which like others may, but need not always, involve the removal or absences of sensitive electronic components from the high-radiation environment. For example, instead of having a CCD or CID imaging sensor or vidicon camera tube directly in the high-radiation area, the optical image is raster-scanned across the end of a radiation-hardened optical fiber by a radiation-tolerant rotating mirror. This system uses radiation-hard fiber cable—one large core pure silica high-OH fiber and one fluorine-doped silica fiber—to mitigate radiation induced absorption of the optical fiber. For high radiation environments, the imaging can be formed with refractive lenses made from radiation-tolerant materials such as fused silica or sapphire. The scanning portion can utilize two 1-axis scanning mirror micro electromechanical systems (MEMS) devices which handle up to about 1,000 MGy (1 GGy).

The MEMS-based real-time video imaging system can be used in methods involving high radiation and magnetic fields, e.g., found at the Facility for Rare Isotope Beam (FRIB). As above, the camera design is shown schematically in FIG. 15. The video head contains the scanning MEMS, the illuminating and collecting fibers, a collimating lens and an imaging lens, if required for a given application. The laser and associated driver electronics, the MEMS drive electronics, photomultiplier tubes and amplifier, frame grabber and controlling PC are all located outside the radiation environment and connected to the video head in via a flexible conduit. The hermetically sealed conduit routes a large diameter radiation tolerant optical fiber for collection, a radiation tolerant optical fiber for illumination and an electronic MEMS drive cable.

Video Considerations

The system with 640×480 images at the standard video rate of 60 Hz scans in the vertical direction 480 lines sixty times a second or 60*480=28800 lines a second. If a mirror sweeps across an image for one line and back for another then the mirror operates at 28800/2 Hz=14400 Hz or greater to scan the scene. If it is greater, then the image can be made of a partial sweep and the outer edges of the scan discarded. As an aside, this is may be beneficial if the mirror switching is sinusoidal and there is distortion on the edges, and MEMS mirrors switch sinusoidally. This drives the horizontal, fast axis, scanning mirror to operate at 14.4 KHz or greater. Scanning 28800 lines a second with 640 individual pixels on each line means there are at least 640*28800-18,432,000 pixels per second or 54 ns per pixel. Because the system here has one detector (but need not always have just one), the staring time, the time the detector spends collecting light from each point, is 54 ns. This means the optical detection system needs considerable gain. Note that FIG. 15 provides a block diagram of the real-time fiber-based scanning video system for high radiation environments. The remote video imaging head contains the MEMS mirror and is connected to the case by way of the radiation-tolerant optical fiber and electrical drive signal cable. The case contains the MEMS drive electronics, photomultiplier tube (PMT)/Amplifier detection assembly and video frame grabber. The illuminating laser scans across the field of view and the collection fiber collects reflected light.

Scanning Mirror

MEMS devices, as discussed, exhibit radiation hardness of about 1000 MGy (=1 GGy) and higher depending on the specific type, electro-static, thermal, and magnetic. The large magnetic fields tend to point away from magnetic, the fast response scan of the horizontal mirror tends to point away from thermal, leaving a choice of electrostatic MEMS. Mirrorcle Technologies offered a solution of two 1-axis MEMS mirrors, where the fast mirror operates at a resonant frequency ≥20 KHz. A 2-axis product is preferable primarily because the manufacturing and design are significantly easier and least costly. Mirrorcle Technologies provided a 2-axis MEMS mirror to meet these specifications. The embodiment was built using two electrostatic MEMS 1-axis mirrors from Mirrorcle Technologies. Both MEMS mirrors are elliptical: one 0.8 mm×0.88 mm and one 5.0 mm×1.3 mm. To generate 640×480 video, the larger, slower MEMS at 60 Hz in the vertical direction on the video screen and the smaller, faster MEMS at 20 KHz or greater in the horizontal direction. For this frequency, the smaller mirror operates at the mechanical resonant frequency of the MEMS mirror. The mirrors mounted in the optical assembly are shown in FIG. 16.

FIG. 16 illustrates a mechanical design of the scanning head of the radiation-hard vision system with the optical assembly (left) and hermetically sealed housing (right). The camera face has a window for viewing and the electrical and optical cables pass through the sealed tubing on the back. Illuminating light passes through a radiation-tolerant large core optical fiber to the scanning head where it is columnated (lens not shown), focused and deflected by a pair of MEMS mirrors. One mirror scans in horizontal direction and the other scans in the vertical direction to direct light across a test pattern on the left-most plate in the embodiment. In an embodiment, there is an aperture in this plate where the beam emerges on the left. The embodiment targets radiation hardness doses of >75 MGy.

Radiation-Tolerant Fiber

In the previously discussed embodiment, specialty fibers doped with fluorine, used instead of the more common phosphorous, show minimal radiation induced attenuation (RIA) even after an accumulated dose of 200 MGy. Further, the RIA appears to reach saturation at this dose and may not substantially increase for even higher doses. Both fluorine-doped multi-mode fiber with 50 μm core and single mode fiber with 9 μm core are now commercially available. Also in the previous research we found large core pure silica high-OH fiber to exhibit minimal RIA beyond 750 nm. Fluorine doped Draka Super Rad Hard SMF fiber was used for the collection fiber and high —OH Silica 1000 μm core fiber from Molex Polymicro Division for the illumination fiber and lasers operating at 800-830 nm laser light were employed.

Collimating Optic

A refractive optic (a lens) was used for the embodiment because of ease of handling and aligning. Sapphire ball lenses, which are highly radiation tolerant, can be incorporated into the optical assembly. As illustrated in FIG. 17, the collimating lens, a sapphire ball, is held between two plates in the optical assembly with an adjustment for the lens-fiber distance. A mirror directs the collimated beam at the first MEMS mirror. The right side shows the plates apart with showing the ball and folding mirror positions. The left side shows the plates in contact holding the lens in place.

Figures 18A, 18B:
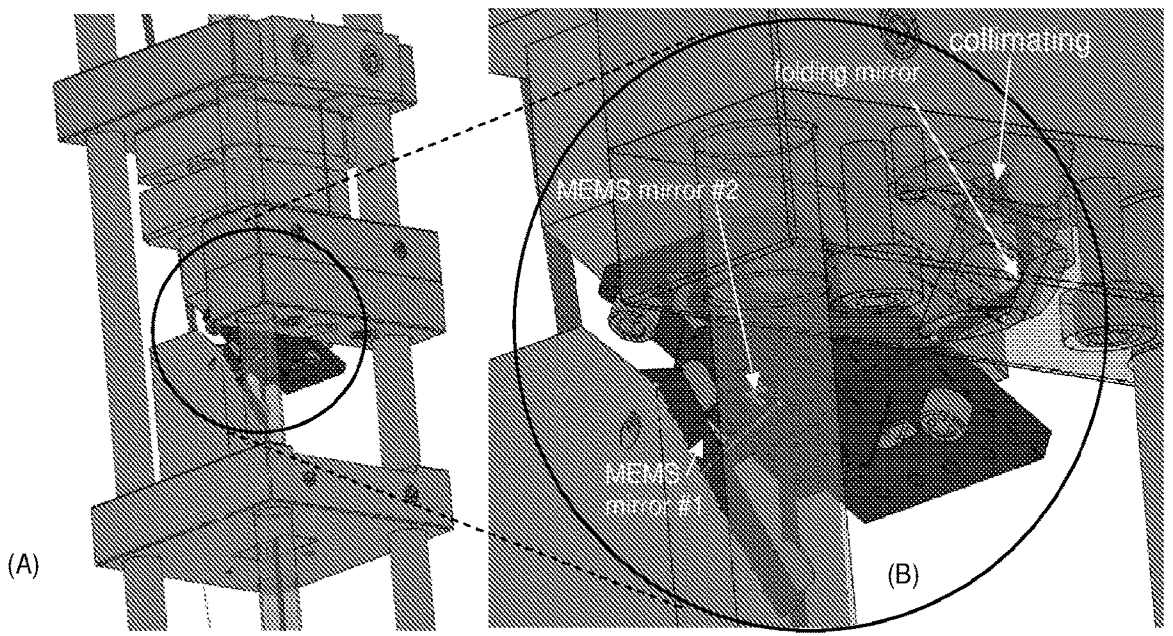

A further view of the assembly and the relation of the optomechanical components is shown in FIGS. 18A and 18B, wherein the optical assembly (18A) and expanded view in 18(B) has some components transparent. The illuminating light is shown in red: The light passes from the fiber (not shown) at the top right of (b) to the collimating lens where a folding mirror directs the beam at the first MEMS mirror (face not shown) reflecting to the second MEMS mirror and out the lower opening. The collected light passes on the collecting fiber (purple).

Optical Detector

For a scanned system, the detector can have high gain, high speed, and low noise, especially in video applications because the detector collects light for roughly 30 ns for each pixel at the fast mirror switching rate of 20 KHz. Thus, a photomultiplier tube (PMT), which has higher gain than an APD, can be used. The camera can use a commercial PMT, a Hamamatsu H10721-20 with a Hamamatsu A12855-01 amplifier. The frequency bandwidth (−3 db) is 150 MHz greater than the rate pixels are sampled, ~35 MHz and does allow 640×480 video resolution.

Electronics

Electronic circuits drive the MEMS mirrors, receive input from the PMT via the TIA, mix these signals with waveforms to drive the frame grabber or the like. A microprocessor is used to generate the waveforms, proved a test pattern, FIG. 19 illustrates circuit boards developed for the camera. The microprocessor (the PSoC 5 LP from Cypress Semiconductor is the lower card in FIG. 19) is connected to the circuit board via a backplane. The PSoC 5 LP microprocessor kit from Cypress Semiconductor can be used to generate waveforms that drive the MEMS mirrors through the high voltage power supply and 10-bit DAC. The microprocessor also provides synchronization signals for the frame grabber (or electronics and software) to produce a video image. A separate, precision timing circuit can be used with the microprocessor to insure registry with the fast MEMS resonance. Corrections to the video image to compensate for the non-linearity of the oscillating wave of the mirrors can be added in the microprocessor coding.

FIG. 19 illustrates a schematic of electronics including microprocessor and circuit board shown in FIG. 20. The microprocessor generates waveforms to drive the dual high voltage amps that drive the MEMS and provides synchronization to the output of the PMT detector.

An embodiment is shown in FIG. 21. The optical assembly holds the two MEMS mirrors, the ingress and egress fibers, and collimating lens. The solid block in front of the mirrors can have an optical aperture to allow the scan beam to exit the camera and permit light into the detecting fiber, but for radiation testing, a solid block with a test pattern can be used for accurate, repeatable tests. The optical assembly and video head are shown in FIG. 22. The assembly fits inside the housing with the aperture (replaced here with a solid block) facing the window and the cabling feeding through the tube in the back into a flexible conduit. The conduit runs outside the radiation environment to the remote system case, FIG. 23, that contains the laser, PMT, and associated electronics.

The components in the head are radiation tolerant while the components in the case do not need to be radiation tolerant. More particularly, FIG. 18 illustrates the MEMS mirrors in the optical assembly. The two electrostatic MEMS mirrors, electrical connections to the MEMS, two radiation hard fibers (collecting fiber not shown) and a collimating lens (not shown) are the components for the camera operation. FIG. 22 illustrates the hermetically sealed ConFlat head enclosure next to the optical assembly. In this embodiment, these are pretty much the only parts of the camera subject to the high radiation environment. The left view shows the window at the front and tube to connect the flexible conduit at the rear of the housing. The face of the optical assembly has an aperture to allow optical access to the window. The optical assembly fits inside the housing with optics facing the window and the cables and fiber feeding through the back. Further, FIG. 23 has the case holding electronics, power supply, the PMT, lasers, etc. The cabling from the case to the head is long enough to keep these components from the harsh radiation environment.

The quality shown in FIG. 24 demonstrates the imaging adequate for radiation testing, with some issues are, image sharpness, the pixel registry (on the left), warping due to non-linearity in the MEMS mirror response and spurious reflections causing a noisy image. Initial irradiation involved gamma radiation. A Cobalt-60 source (FIG. 25) produced gamma radiation at a rate of 150 Gy/hr., which is greater than that found in the Fukushima Daiichi nuclear power plant that was damaged by a tsunami in 2011.

Frame Grabber Processing Software

Unlike most video systems that scan line by line from left to right only, the presently-illustrated camera scans left to right, then right to left. A commercial frame grabber was used to rasterize the image, and software was adapted to reverse every other line, making a comprehensible image.

Importantly, functionality was added to average an arbitrary number of images to decrease noise and improve picture. Other functionality was added to: allow the user to change the vertical and horizontal offset; save single images; control access to the frame grabber hardware; label frames; highlight and record single lines in the frame; and to convert single images to videos. A flowchart of the Frame Grabber Viewer software is shown in FIG. 26.

FIGS. 27 (*a*) and (*b*) show images of a test pattern taken with the camera. A single image (left) and an average of 10 images to reduce noise via the frame grabber software (right).

Thermal Testing

A camera was placed in a Thermotron oven and run at temperatures from 25° ° C. to 100° C. Images from the camera at 25° C. and 100° ° C. are shown in FIGS. 28 (*a*) and (*b*), respectively. Temperature had little to no effect on the image quality. This test was on the camera with the gamma-irradiated MEMS mirror assembly. The camera was held at temperature for 10 minutes to ensure thermal equilibrium.

Vibration Testing

A camera was dropped from approximately 6" and resulted in no discernable change in image quality. Further, the unit placed next to a commercial vibrator. Figures during vibration and post vibration are shown in FIG. 29. The images in FIG. 29 were taken during vibration (a) and post vibration (b). During vibration, the image is blurred, however, post vibration there is no discernable effect on image quality. This test was on the camera with the gamma-irradiated MEMS mirror assembly.

Radiation Testing

FIG. 30 shows images from a camera using a MEMS assembly irradiated with a dose of 13 KGy Gamma rays. One of ten captured images with random noise (a). Average of 10 images to reduce noise (b).Except for the electrostatic MEMS, all components used in the camera head have been tested under varying types of radiation. The preliminary test was irradiating the MEMS mirror assembly with a Co60 gamma source.

Gamma Irradiation

The Cobalt-60 source (FIG. 24) produced gamma radiation at a rate of 150 Gy/hr. The test runs are documented in FIG. 31 which is a table of the camera irradiation schedule. The test assembly was exposed to 13,057.5 Gy over 88.5 hours with an average dose rate of 147.54 Gy/hr.

Statement of Scope

In sum, it is important to recognize that this disclosure has been written as a thorough teaching rather than as a narrow dictate or disclaimer. Reference throughout this specification to “one embodiment”, “an embodiment”, or “a specific embodiment” means that a particular feature, structure, or characteristic described in connection with the embodiment is included in at least one embodiment and not necessarily in all embodiments. Thus, respective appearances of the phrases “in one embodiment”, “in an embodiment”, or “in a specific embodiment” in various places throughout this specification are not necessarily referring to the same embodiment. Furthermore, the particular features, structures, or characteristics of any specific embodiment may be combined in any suitable manner with one or more other embodiments. It is to be understood that other variations and modifications of the embodiments described and illustrated herein are possible in light of the teachings herein and are to be considered as part of the spirit and scope of the present subject matter.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted. Furthermore, the term “or” as used herein is generally intended to mean “and/or” unless otherwise indicated. Combinations of components or steps will also be considered as being noted, where terminology is foreseen as rendering the ability to separate or combine is unclear.

As used in the description herein and throughout the claims that follow, “a”, “an”, and “the” includes plural references unless the context clearly dictates otherwise. Also, as used in the description herein and throughout the claims that follow, the meaning of "in" includes "in" and "on" unless the context clearly dictates otherwise. Variation from amounts specified in this teaching can be "about" or "substantially," to accommodate tolerance for such as acceptable manufacturing tolerances.

The foregoing description of illustrated embodiments, including what is described in the Abstract and the Modes, and all disclosure and the implicated industrial applicability, are not intended to be exhaustive or to limit the subject matter to the precise forms disclosed herein. While specific embodiments of, and examples for, the subject matter are described herein for teaching-by-illustration purposes only, various equivalent modifications are possible within the spirit and scope of the present subject matter, as those skilled in the relevant art will recognize and appreciate. As indicated, these modifications may be made in light of the foregoing description of illustrated embodiments and are to be included, again, within the true spirit and scope of the subject matter disclosed herein.

The invention claimed is:

1. An apparatus comprising:

a camera head containing a scanning mirror system that includes a radiation-insensitive mirror and devoid of any active light source and devoid of any active light detector wherein the scanning mirror system comprises a two-axis microelectromechanical systems tip/tilt mirror configured to raster-scan a scene in two dimensions;

wherein the camera head comprises a hermetically sealed housing having an optical window and being configured for deployment in a nuclear facility and/or a radiation hot-cell;

control electronics, distal to the camera head and located outside a high-radiation environment in which the camera head is configured to be located;

a radiation tolerant optical fiber located intermediate the camera head and the control electronics so as to convey light to a scene to be scanned;

at least one radiation-tolerant optical fiber located intermediate the camera head and the control electronics so as to convey backscattered light from the scene to the control electronics; and wherein the control electronics comprises an active light source located to provide light to the radiation tolerant fiber, an active detector located to receive the backscattered light, a control that controls the radiation-insensitive mirror, and electronics and software, arranged such that the control, the active light source, the active detector, and the electronics and software cooperate to produce an image of the scene, wherein the camera head remains operable after receiving at least 13 kGy total ionizing dose.

2. The apparatus of claim 1, wherein the camera head and said at least one radiation-tolerant optical fiber are sufficiently radiation tolerant that the image of the scene can be produced after having sustained a nuclear radiation dose of 13,057.5 Gy over 88.5 hours with an average dose rate of 147.54 Gy/hr.

3. The apparatus of claim 1, wherein said at least one radiation-tolerant optical fiber comprises SiO2.

4. The apparatus of claim 3, wherein said camera head contains a radiation-insensitive focusing optic comprising sapphire.

5. The apparatus of claim 3, wherein said camera head contains a radiation-insensitive focusing optic comprising borosilicate containing CeO2.

6. The apparatus of claim 3, wherein said camera head contains a radiation-insensitive focusing optic comprising synthetic quartz.

7. The apparatus of claim 1, wherein said at least one radiation-tolerant optical fiber is doped with Fluorine.

8. The apparatus of claim 3, wherein said at least one radiation-tolerant optical fiber is doped with Fluorine.

9. The apparatus of claim 1, wherein said at least one radiation-tolerant optical fiber is doped with OH.

10. The apparatus of claim 3, wherein said at least one radiation-tolerant optical fiber is doped with OH.

11. A process including:

locating a camera head in a high radiation environment, wherein the camera head is hermetically sealed for nuclear facility and/or hot-cell deployment, distal from control electronics, with a radiation-tolerant optical fiber, located intermediate the camera head and the control electronics, so as to convey light to a scene to be scanned and with at least one radiation-tolerant optical fiber located intermediate the camera head and the control electronics so as to convey backscattered light from the camera head to the control electronics, with the camera head containing a scanning mirror system that comprises a two-axis MEMS tip/tilt raster-scanning mirror radiation-insensitive mirror and is devoid of any active light source and is devoid of any active light detector, and with the control electronics comprising an active light source located to provide light to the radiation-tolerant optical fiber, an active detector located to receive the backscattered light from said at least one radiation-tolerant optical fiber, a control that controls the radiation-insensitive mirror, and electronics and software, wherein the active light source and the active detector are located outside the high radiation environment;

scanning, with the radiation-insensitive mirror and while the camera head is in the high radiation environment, a scene to produce the backscattered light; and processing the backscattered light, with the active detector, and the electronics and software, to produce a video signal, or an image signal, that is an image of the scene, and wherein the camera head remains operable after receiving at least 13 kGy total ionizing dose.

12. The process of claim 11, wherein the camera head and said at least one radiation-tolerant optical fiber are sufficiently radiation tolerant that the image of the scene can be produced after having sustained a nuclear radiation dose of 13,057.5 Gy over 88.5 hours with an average dose rate of 147.54 Gy/hr.

13. The process of claim 11, wherein the locating is carried out with said at least one radiation-tolerant optical fiber comprising SiO2.

14. The process of claim 11, wherein the locating of the camera head in the high radiation environment comprises locating the camera head in a nuclear reactor.

15. The process of claim 12, wherein the locating of the camera head in the high radiation environment comprises locating the camera head in a nuclear reactor.

16. The process of claim 11, wherein the locating of the camera head in the high radiation environment comprises locating the camera head in proximity of a nuclear reactor.

17. The process of claim 11, wherein the locating of the camera head in the high radiation environment comprises locating the camera head in proximity to hot cell radiation materials.

18. The process of claim 11, wherein the locating the camera head in the high radiation environment comprises locating the camera head in proximity to nuclear fuel production, nuclear fuel inspection, nuclear fuel repair, or nuclear fuel storage.

19. The process of claim 11, wherein the locating of the camera head in the high radiation environment comprises locating the camera head in proximity to a nuclear accident.

* * * * *